(12) United States Patent
Sugawara et al.

(10) Patent No.: US 11,433,967 B2
(45) Date of Patent: Sep. 6, 2022

(54) STRADDLED VEHICLE

(71) Applicant: YAMAHA HATSUDOKI KABUSHIKI KAISHA, Iwata (JP)

(72) Inventors: Kohei Sugawara, Shizuoka (JP); Tomoki Onoue, Shizuoka (JP); Shinya Yamada, Shizuoka (JP); Akiyoshi Endo, Shizuoka (JP); Akihiro Suzuki, Shizuoka (JP); Yoshinori Teramoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 174 days.

(21) Appl. No.: 17/030,732

(22) Filed: Sep. 24, 2020

(65) Prior Publication Data

US 2021/0094648 A1 Apr. 1, 2021

(30) Foreign Application Priority Data

Sep. 27, 2019 (JP) .............................. JP2019-176632

(51) Int. Cl.
*B62K 19/46* (2006.01)
*B62J 9/24* (2020.01)

(52) U.S. Cl.
CPC .................. *B62K 19/46* (2013.01); *B62J 9/24* (2020.02)

(58) Field of Classification Search
CPC .... B62J 9/26; B62J 9/24; B62K 19/46; B62K 19/40

(Continued)

(56) References Cited

U.S. PATENT DOCUMENTS 2,944,712 A * 7/1960 Glenny ...................... B62J 9/24
 224/430
3,944,009 A * 3/1976 Katagiri ................. B62K 19/46
 280/288.4

(Continued)

FOREIGN PATENT DOCUMENTS

CN 101249856 A 8/2008
CN 101468682 A 7/2009

(Continued)

OTHER PUBLICATIONS

Office Action in the couterpart Indian patent application (202024040576) dated May 12, 2021.

(Continued)

*Primary Examiner* — Jacob D Knutson
*Assistant Examiner* — Myles A Harris
(74) *Attorney, Agent, or Firm* — Rabin & Berdo, P.C.

(57) ABSTRACT

A motorcycle includes left and right side cases respectively configured to be attachable to and detachable from left and right portions of a body frame, left and right rotation supporters that respectively support upper portions of the left and right side cases, and left and right rotation attenuation mechanisms that respectively attenuate rotations of the left and right side cases about first and second axes. The left and right rotation attenuation mechanisms respectively include bolts that respectively extend in directions of the first and second axes, rotation members respectively connected to lower portions of the left and right side cases and being supported by the bolts to be rotatable about third and fourth axes that are different from the first and second axes, and inner outer cylindrical dampers respectively provided between the bolts and the rotation members.

7 Claims, 12 Drawing Sheets

(58) Field of Classification Search
USPC .......................................................... 280/202
See application file for complete search history.

(56) References Cited

U.S. PATENT DOCUMENTS

| | | | | |
|---|---|---|---|---|
| 4,081,117 A | * | 3/1978 | Crane | B62J 9/23 |
| | | | | 224/430 |
| 4,096,980 A | | 6/1978 | Clow | |
| 4,260,084 A | * | 4/1981 | Warren, Jr. | B62J 9/24 |
| | | | | 224/430 |
| 5,025,883 A | * | 6/1991 | Morinaka | B62J 7/00 |
| | | | | 296/76 |
| 6,068,075 A | * | 5/2000 | Saiki | B62J 27/30 |
| | | | | 180/219 |
| 6,293,450 B1 | * | 9/2001 | Aron | B62J 9/27 |
| | | | | 224/430 |
| 6,820,782 B1 | * | 11/2004 | Monson | B62J 9/27 |
| | | | | 224/430 |
| 7,175,220 B2 | * | 2/2007 | Kashiwagi | B62J 11/00 |
| | | | | 280/288.4 |
| 8,146,944 B2 | * | 4/2012 | Miller | B62J 9/23 |
| | | | | 280/769 |
| 8,579,169 B2 | * | 11/2013 | Racz | B62J 7/04 |
| | | | | 224/430 |
| 9,010,598 B2 | * | 4/2015 | Thompson | B62J 9/27 |
| | | | | 224/431 |
| 9,616,956 B2 | * | 4/2017 | Aron | B62J 9/23 |
| 10,144,472 B2 | * | 12/2018 | Bunyer | B62J 7/04 |
| 2004/0232183 A1 | * | 11/2004 | Watanabe | B62J 9/23 |
| | | | | 224/431 |
| 2005/0150921 A1 | * | 7/2005 | Schneider | B62J 9/26 |
| | | | | 224/413 |
| 2006/0163302 A1 | * | 7/2006 | Knoch | B62J 9/27 |
| | | | | 224/431 |
| 2010/0307852 A1 | | 12/2010 | Aramayo, II et al. | |
| 2011/0049205 A1 | | 3/2011 | Laperle et al. | |
| 2013/0292438 A1 | * | 11/2013 | Armstrong | B62J 9/24 |
| | | | | 224/447 |
| 2017/0008585 A1 | * | 1/2017 | Wada | B62J 9/24 |
| 2017/0247074 A1 | * | 8/2017 | Dery St-Cyr | B62J 9/30 |

FOREIGN PATENT DOCUMENTS

| | | | | |
|---|---|---|---|---|
| CN | 209274790 U | | 8/2019 | |
| CN | 211592793 U | * | 9/2020 | |
| CN | 112849316 A | * | 5/2021 | ............... B62J 9/24 |
| DE | 102017200843 A1 | | 7/2018 | |
| DE | 102017221837 A1 | | 6/2019 | |
| EP | 2574534 A2 | * | 4/2013 | ............... B62J 7/04 |
| JP | H03104789 A | | 5/1991 | |
| JP | 2009113679 A | | 5/2009 | |
| JP | 5478311 B2 | | 4/2014 | |
| JP | 2014061721 A | | 4/2014 | |
| JP | 2015000649 A | | 1/2015 | |
| JP | 2017114332 A | * | 6/2017 | |
| TW | M535677 U | | 1/2017 | |
| WO | 2010021209 A1 | | 2/2010 | |

OTHER PUBLICATIONS

Office Action in the couterpart Chinese patent application (202011027251.0) dated Sep. 24, 2021.

Office Action in the counterpart Canadian patent application (3094214) dated Oct. 21, 2021.

* cited by examiner

STRADDLED VEHICLE

CROSS REFERENCE TO RELATED APPLICATIONS

This application is based upon and claims the benefit of priority of the prior Japanese Patent Application No. 2019-176632, filed on Sep. 27, 2019, the entire contents of which are incorporated herein by reference.

BACKGROUND

Technical Field

The present invention relates to a straddled vehicle including side cases.

Description of Related Art

In a straddled vehicle such as a motorcycle, side cases may be respectively provided at right and left side portions of the vehicle in order to increase luggage capacity. For example, JP 2015-649 A describes a motorcycle having a pair of left and right side bags at right and left side portions of rear parts of the vehicle.

Specifically, in the motorcycle, upper portions of the main bodies of the left and right side bags are fixed to a seat frame via side bag brackets. Further, lower front portions of the main bodies of the bags are fixed to step plates via elastic members, and inner rear portions are fixed to side surface portions of rear fenders via elastic members. In this manner, in the motorcycle described in JP 2015-649 A, each of the left and right side bags is supported at the vehicle main body with three or more portions of the side bag being fixed.

SUMMARY

As a phenomenon of vibration that occurs in a motorcycle during traveling, the weave mode that includes swinging of a vehicle body in a left-and-right direction has been known. The weave mode is a phenomenon of vibration that is caused by a combination of rotational vibration about a yaw axis of the vehicle body and rotational vibration about a roll axis of the vehicle body and is likely to occur in a relatively high speed range.

The likelihood of an occurrence of the weave mode depends on the shape of the motorcycle. For example, in the motorcycle having the left and right side bags, as described above, the speed range in which the weave mode occurs is lower than that of a motorcycle not having side bags. Therefore, the traveling speed of the motorcycle having the left and right side bags is limited to a relatively low speed range.

An object of the present invention is to provide a straddled vehicle that is capable of suppressing an occurrence of the weave mode while increasing luggage capacity.

(1) A straddled vehicle according to one aspect of the present invention includes a body frame that extends in a vehicle front-and-rear direction, a pair of left and right side cases that is configured to be attachable to and detachable from right and left side portions of the body frame, a left rotation supporter that supports an upper portion of the left side case at the body frame such that the left side case is rotatable about a first axis with respect to the body frame with the left side case attached to the body frame, a left rotation attenuator that attenuates rotation of the left side case about the first axis, a right rotation supporter that supports an upper portion of the right side case at the body frame such that the right side case is rotatable about a second axis with respect to the body frame with the right side case attached to the body frame, and a right rotation attenuator that attenuates rotation of the right side case about the second axis, wherein the left rotation attenuator includes a first rotation shaft member that extends in a direction of a third axis that is different from the first axis, a first rotation member supported by the first rotation shaft member to be connected to a lower portion of the left side case and rotatable about the third axis with the left side case attached to the body frame, and a first inner outer cylindrical damper provided between the first rotation shaft member and the first rotation member, and the right rotation attenuator includes a second rotation shaft member that extends in a direction of a fourth axis that is different from the second axis, a second rotation member supported by the second rotation shaft member to be connected to a lower portion of the right side case and rotatable about the fourth axis with the right side case attached to the body frame, and a second inner outer cylindrical damper provided between the second rotation shaft member and the second rotation member.

In the straddled vehicle, the pair of left and right side cases is attachable to and detachable from left and right side portions of the body frame.

With the left side case attached to the body frame, the upper portion of the left side case is supported by the left rotation supporter at the body frame to be rotatable about the first axis. In this case, because rotation of the left side case with respect to the body frame is allowed, the left side case swings around the first axis during traveling of the vehicle.

The lower portion of the left side case is connected to the first rotation member. The first rotation member is supported by the first rotation shaft member to be rotatable about the third axis. The first inner outer cylindrical damper is provided between the first rotation member and the first rotation shaft member. When the left side case swings, the first rotation member rotates about the third axis. At this time, a relative rotational force is generated around the third axis between the first rotation member and the first rotation shaft member. Part of this rotational force is absorbed by the first inner outer cylindrical damper. Thus, the rotation of the left side case is attenuated. At this time, the first inner outer cylindrical damper functions as a dynamic damper with respect to the rotational vibration of the left side case.

With the right side case attached to the body frame, the upper portion of the right side case is supported by the right rotation supporter at the body frame to be rotatable about the second axis. In this case, because the rotation of the right side case with respect to the body frame is allowed, the right side case swings around the second axis during traveling of the vehicle.

The lower portion of the right side case is connected to the second rotation member. The second rotation member is supported by the second rotation shaft member to be rotatable about the fourth axis. The second inner outer cylindrical damper is provided between the second rotation member and the second rotation shaft member. When the right side case swings, the second rotation member rotates about the fourth axis. At this time, a relative rotational force is generated around the fourth axis between the second rotation member and the second rotation shaft member. Part of this rotational force is absorbed by the second inner outer cylindrical damper. Thus, the rotation of the right side case is attenuated. At this time, the second inner outer cylindrical damper functions as a dynamic damper with respect to the rotational vibration of the right side case.

In this manner, in the above-mentioned straddled vehicle, with the left and right side cases attached to the body frame, the rotation of each side case is attenuated by the first and second inner outer cylindrical dampers while being allowed. In the first and second inner outer cylindrical dampers, an attenuation force corresponding to the magnitude of rotation is generated.

Further, in the above-mentioned straddled vehicle, the left and right side cases are attached to the body frame independently from each other. Thus, even in a case where one side case of the left and right side cases rotates, the other side case does not operate in connection with the one side case. With such a configuration, even in a case where different rotational forces are respectively generated in the left and right side cases due to a leftward or rightward tilt of the straddled vehicle during turning of the vehicle, for example, the one side case is not affected by the rotation of the other side case. Thus, the rotation of each of the left and right side cases is attenuated in a short period of time in accordance with the magnitude of rotation. Therefore, swinging of the vehicle caused by swinging of the left and right side cases is reduced in a short period of time.

As a result, the straddled vehicle that is capable of suppressing generation of the weave mode while increasing luggage capacity is realized.

(2) The first axis may extend from a rear portion of the vehicle to a front portion of the vehicle, the second axis may extend from a rear portion of the vehicle to a front portion of the vehicle, the third axis may extend in a vehicle up-and-down direction, and the fourth axis may extend in the vehicle up-and-down direction.

In this case, the left side case swings around the first axis in a vehicle left-and-right direction during traveling of the vehicle. In contrast, the first rotation member rotates about the third axis extending in a vehicle up-and-down direction, whereby the rotation of the left side case is attenuated. Further, during traveling of the vehicle, the right side case swings around the second axis in the vehicle left-and-right direction. In contrast, the second rotation member rotates about the fourth axis extending in the vehicle up-and-down direction, whereby the rotation of the right side case is attenuated.

(3) Each of the first and second rotation shaft members may be fixed to the body frame. In this case, because the first and second rotation shaft members are fixed to the body frame, the rotation of the left and right side cases with respect to the body frame can be appropriately attenuated by the first and second inner outer cylindrical dampers.

(4) The first inner outer cylindrical damper may include a first inner cylinder into which the first rotation shaft member is inserted, a first rubber bush provided to surround an outer peripheral surface of the first inner cylinder, and a first outer cylinder provided to surround the first rubber bush and fixed to the first rotation member, and the second inner outer cylindrical damper may include a second inner cylinder into which the second rotation shaft member is inserted, a second rubber bush provided to surround an outer peripheral surface of the second inner cylinder, and a second outer cylinder provided to surround the second rubber bush and fixed to the second rotation member. In this case, the rotation of the left and right side cases can be attenuated with a simple configuration.

(5) The left rotation supporter may include a third rotation shaft member connected to the body frame to extend in a direction of the first axis, a third rotation member supported by the third rotation shaft member to be connected to an upper portion of the left side case and rotatable about the first axis with the left side case attached to the body frame, and a third inner outer cylindrical damper provided between the third rotation shaft member and the third rotation member, and the right rotation supporter may include a fourth rotation shaft member connected to the body frame to extend in a direction of the second axis, a fourth rotation member supported by the fourth rotation shaft member to be connected to an upper portion of the right side case and rotatable about the second axis with the right side case attached to the body frame, and a fourth inner outer cylindrical damper provided between the fourth rotation shaft member and the fourth rotation member.

In this case, with the left side case attached to the body frame, the upper portion of the left side case is connected to the third rotation member. The third rotation member is supported by the third rotation shaft member to be rotatable about the first axis. The third inner outer cylindrical damper is provided between the third rotation member and the third rotation shaft member. When the left side case swings, the third rotation member rotates about the first axis. At this time, a relative rotational force is generated around the first axis between the third rotation member and the third rotation shaft member. Part of this rotational force is absorbed by the third inner outer cylindrical damper. Thus, the rotation of the left side case is further attenuated.

Further, with the right side case attached to the body frame, the upper portion of the right side case is connected to the fourth rotation member. The fourth rotation member is supported by the fourth rotation shaft member to be rotatable about the second axis. The fourth inner outer cylindrical damper is provided between the fourth rotation member and the fourth rotation shaft member. When the right side case swings, the fourth rotation member rotates about the second axis. At this time, a relative rotational force is generated around the second axis between the fourth rotation member and the fourth rotation shaft member. Part of this rotational force is absorbed by the fourth inner outer cylindrical damper. Thus, the rotation of the right side case is further attenuated.

(6) The third inner outer cylindrical damper may include a third inner cylinder into which the third rotation shaft member is inserted, a third rubber bush provided to surround an outer peripheral surface of the third inner cylinder and a third outer cylinder provided to surround the third rubber bush and fixed to the third rotation member, and the fourth inner outer cylindrical damper may include a fourth inner cylinder into which the fourth rotation shaft member is inserted, a fourth rubber bush provided to surround an outer peripheral surface of the fourth inner cylinder and a fourth outer cylinder provided to surround the fourth rubber bush and fixed to the fourth rotation member. In this case, the rotation of the left and right side cases can be attenuated with a simple configuration.

(7) The first rotation shaft member may be connected to the body frame at a position farther forward than the left side case, the first rotation member may be provided to extend rearwardly of the vehicle from the first rotation shaft member, the left side case may have a first insertion portion which opens forwardly of the vehicle and into which a rear end portion of the first rotation member is insertable, the second rotation shaft member may be connected to the body frame at a position farther forward than the right side case, the second rotation member may be provided to extend rearwardly of the vehicle from the second rotation shaft member, and the right side case may have a second insertion portion which opens forwardly of the vehicle and into which a rear end portion of the second rotation member is insertable.

In this case, the rear end portion of the first rotation member is inserted into the insertion portion of the left side case, whereby the lower portion of the left side case is appropriately connected to the body frame. Thus, the supporting state of the left side case with respect to the body frame is stabilized.

Further, the rear end portion of the second rotation member is inserted into the insertion portion of the right side case, whereby the lower portion of the right side case is appropriately connected to the body frame. Thus, the supporting state of the right side case with respect to the body frame is stabilized.

Other features, elements, characteristics, and advantages of the present disclosure will become more apparent from the following description of preferred embodiments of the present disclosure with reference to the attached drawings.

DETAILED DESCRIPTION

A straddled vehicle according to one embodiment of the present invention will be described below with reference to the drawings. A motorcycle will be described as one example of the straddled vehicle.

[1] Schematic Configuration of Motorcycle

Figure 1:
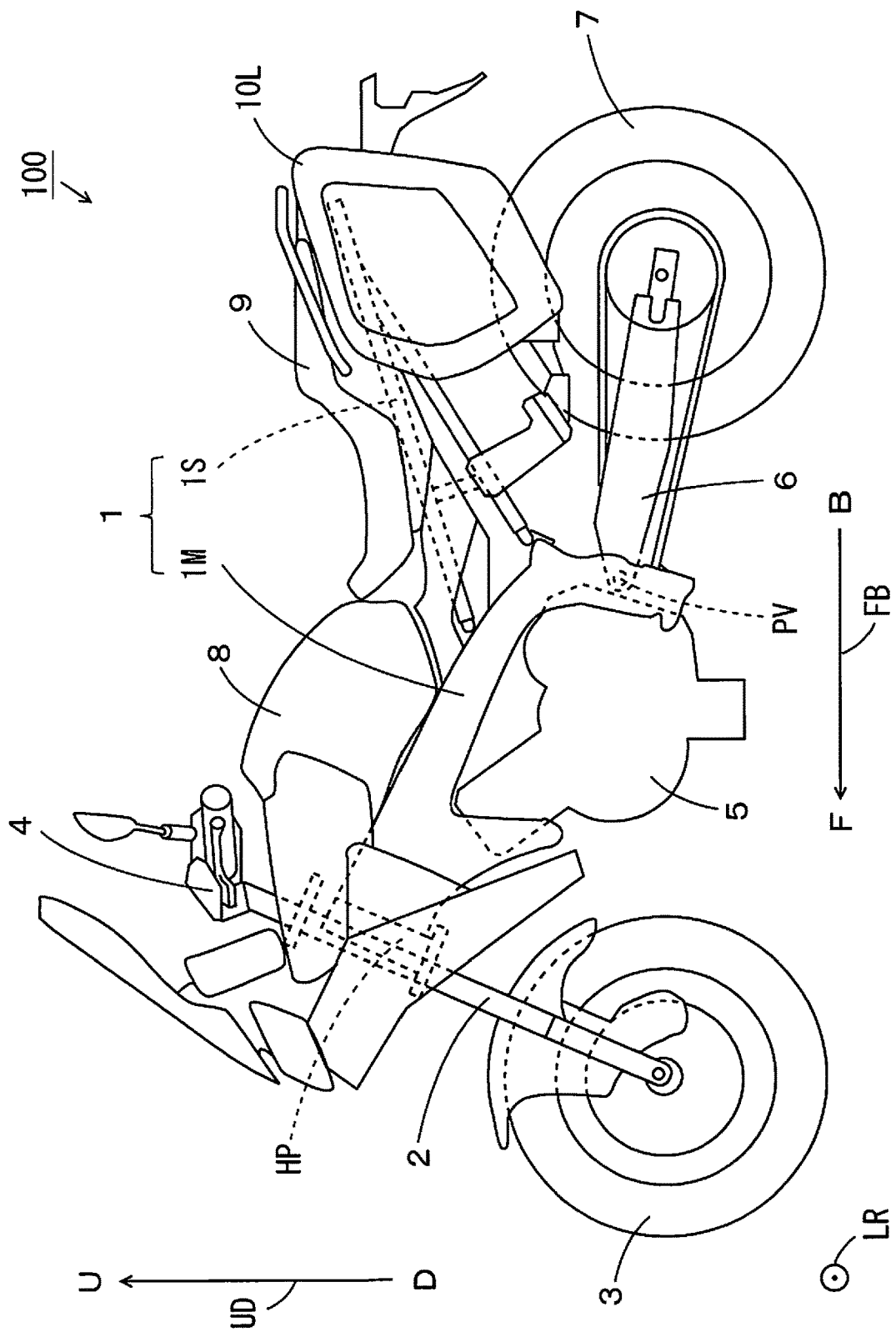
FIG. 1 is a side view of a motorcycle according to one embodiment of the present invention.

FIG. 1 is a side view of the motorcycle according to the one embodiment of the present invention. In FIG. 1, the motorcycle 100 standing up to be perpendicular to the road surface is shown. In each of FIG. 1 and subsequent given diagrams, a front-and-rear direction FB, a left-and-right direction LR and an up-and-down direction UD of the motorcycle 100 are suitably indicated by arrows. The direction in which the arrow is directed in the front-and-rear direction FB is referred to as forward, and its opposite direction is referred to as rearward. Further, the direction in which the arrow is directed in the left-and-right direction LR is referred to as leftward, and its opposite direction is referred to as rightward. Further, the direction in which the arrow is directed in the up-and-down direction UD is referred to as upward, and its opposite direction is referred to as downward. Further, in each of FIG. 1 and subsequent given diagrams, forward, rearward, leftward, rightward, upward and downward are indicated by reference characters F, B, L, R, U and D, respectively.

As shown in FIG. 1, the motorcycle 100 includes a metallic body frame 1. The body frame 1 extends in the front-and-rear direction FB and includes a main frame 1M and a sub-frame 1S. The front end of the main frame 1M constitutes a head pipe HP. The main frame 1M is formed to extend rearwardly and downwardly from the head pipe HP. The sub-frame 1S is attached to the main frame 1M so as to extend rearwardly and slightly upwardly from the rear end and the vicinity of the rear end of the main frame 1M.

A front fork 2 is provided at the head pipe HP to be swingable in the left-and-right direction LR. A front wheel 3 is rotatably supported at the lower end of the front fork 2. A handle 4 is provided at the upper end of the front fork 2.

The main frame 1M supports an engine 5 at a position farther downward and farther rearward than the head pipe HP. A fuel tank 8 is provided above the engine 5. A seat 9 is provided at a position farther rearward than the fuel tank 8. The fuel tank 8 is supported by the main frame 1M and located above the main frame 1M. The seat 9 is supported mainly by the sub-frame 1S and located above the sub-frame 1S. The seat 9 of the present example is a tandem seat in which two seating portions for two riders are integrally formed. A rider who operates the motorcycle 100 can be seated on the front half of the seat 9. A rider who does not operate the motorcycle 100 can be seated on the rear half of the seat 9.

A rear arm 6 is provided to extend rearwardly from a lower rear end portion of the main frame 1M. The rear arm 6 is supported by the main frame 1M via a pivot shaft PV and a rear suspension (not shown). A rear wheel 7 is rotatably supported at the rear end of the rear arm 6. The rear wheel 7 is rotated as a drive wheel by the motive power generated from the engine 5.

A pair of left and right side cases 10L, 10R is provided attachably and detachably at both of the left and right side portions of the sub-frame 1S in the rear end portion of the motorcycle 100 and its vicinity. In FIG. 1, only the left side case 10L is shown. One portion (an upper portion) of each side case 10L, 10R overlaps with part of the sub-frame 1S in a side view of the vehicle. Further, another portion (a lower portion) of each side case 10L, 10R overlaps with part of the rear wheel 7 in a side view of the vehicle.

Figure 2:
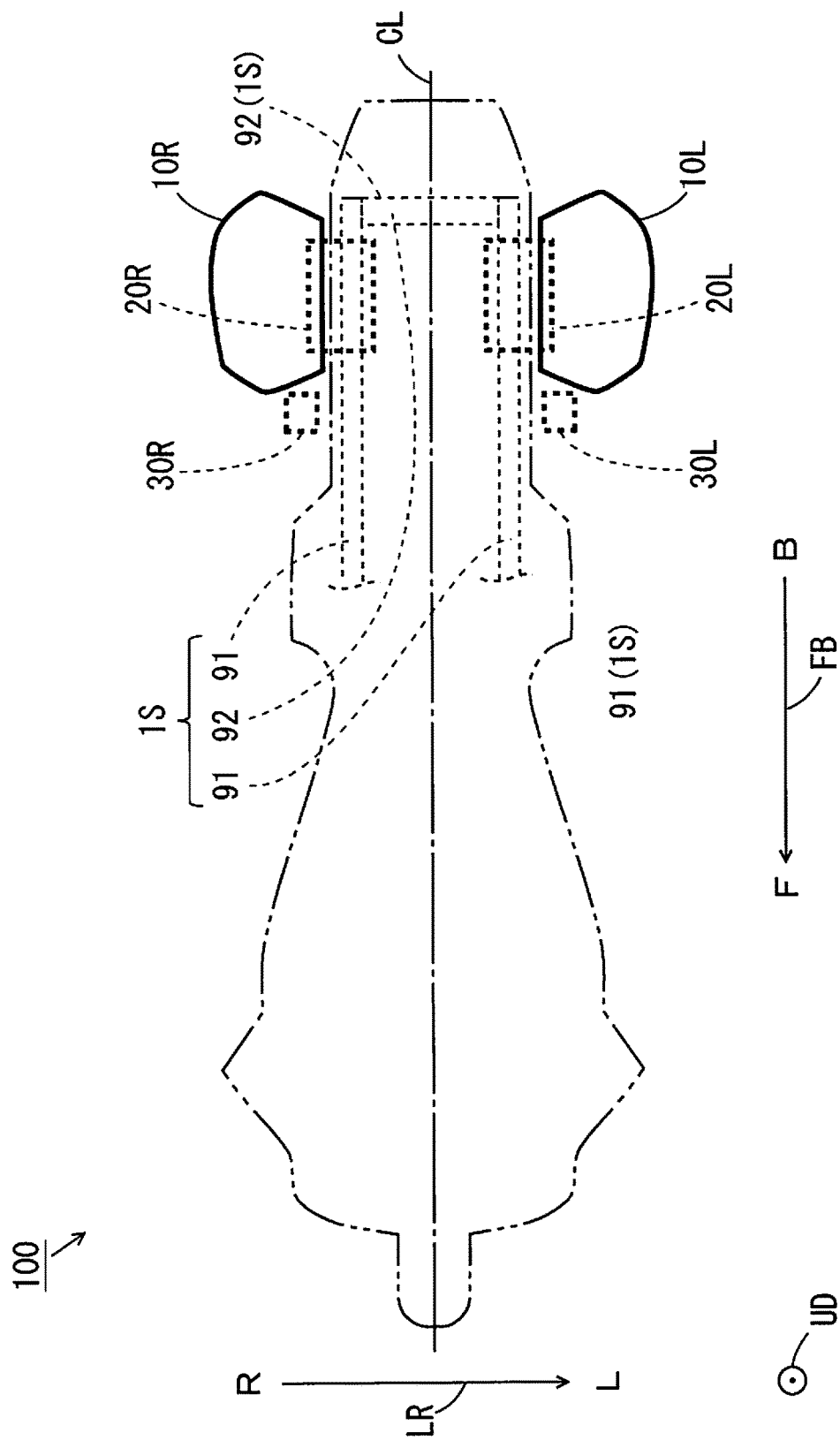
FIG. 2 is a schematic plan view of the motorcycle showing left and right side cases being attached to a sub-frame.

The left and right side cases 10L, 10R are attached to the sub-frame 1S. FIG. 2 is a schematic plan view of the motorcycle 100 showing the left and right side cases 10L, 10R being attached to the sub-frame 1S. In FIG. 2, the outer shape of the portions except for the left and right side cases 10L, 10R of the motorcycle 100 is indicated by the two-dots and dash line.

As shown in FIG. 2, the sub-frame 1S includes a pair of left and right upper rails 91 and a coupling member 92. The left and right upper rails 91 are provided to extend in the front-and-rear direction FB and be arranged in the left-and-right direction LR in a plan view of the vehicle. The coupling member 92 couples the rear end portions of the left and right upper rails 91 to each other.

In the sub-frame 1S, a pair of left and right rotation support mechanisms 20L, 20R respectively corresponding to the left and right side cases 10L, 10R is provided. Further, in the sub-frame 1S, a pair of left and right rotation attenuation mechanisms 30L, 30R respectively corresponding to the left and right side cases 10L, 10R is provided. In FIG. 2, the left and right side cases 10L, 10R are schematically indicated by the thick solid lines. Further, the left and right rotation support mechanisms 20L, 20R and the left and right rotation attenuation mechanisms 30L, 30R are schematically indicated by the thick dotted lines.

The left side case 10L is attached to the left upper rail 91 by the left rotation support mechanism 20L. The left rotation attenuation mechanism 30L is connected to a lower front end portion of the left side case 10L and supported at a left lower rail 93 (FIG. 3), described below, provided below the left upper rail 91.

The right side case 10R is attached to the right upper rail 91 by the right rotation support mechanism 20R. The right rotation attenuation mechanism 30R is connected to a lower front end portion of the right side case 10R and supported at the right lower rail 93 (FIG. 4), described below, provided below the right upper rail 91.

The left and right side cases 10L, 10R basically have the symmetric structure about a vertical plane including a vehicle central line CL (hereinafter referred to as a central vertical plane) extending in the front-and-rear direction FB through the center of the motorcycle 100. The left and right rotation support mechanisms 20L, 20R basically have the symmetric structure about the central vertical plane similarly to the left and right side cases 10L, 10R. The left and right rotation attenuation mechanisms 30L, 30R basically have the symmetric structure about the central vertical plane similarly to the left and right side cases 10L, 10R. The left and right rotation support mechanisms 20L, 20R and the left and right rotation attenuation mechanisms 30L, 30R will be described below.

Figure 3:
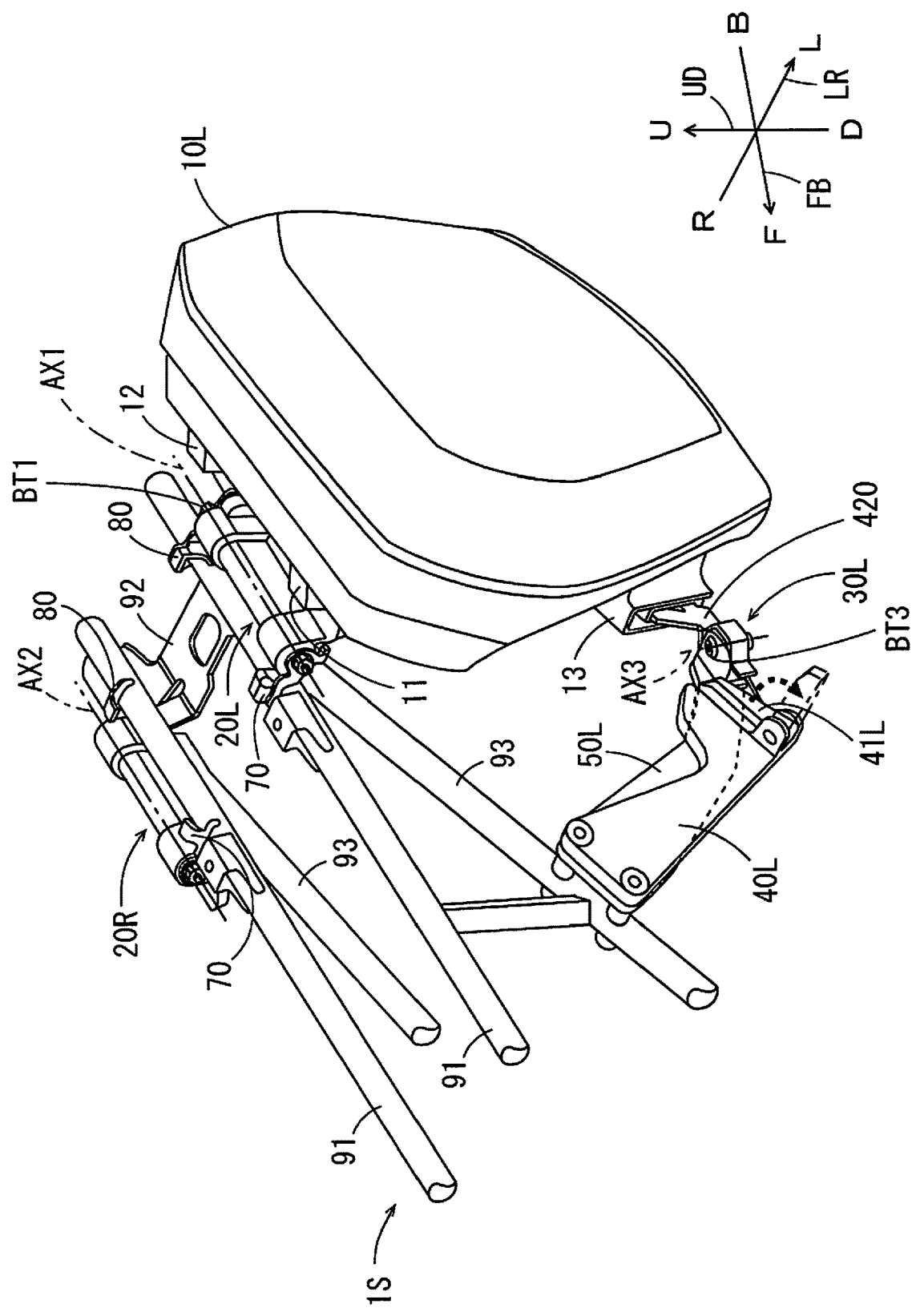
FIG. 3 is an external perspective view mainly showing the left side case being attached to the sub-frame.

[2] Rotation Support Mechanisms 20L, 20R and Rotation Attenuation Mechanisms 30L, 30R (1) Overview of Rotation Support Mechanisms 20L, 20R and Rotation Attenuation Mechanisms 30L, 30R FIG. 3 is an external perspective view mainly showing the left side case 10L being attached to the sub-frame 1S. As shown in FIG. 3, the sub-frame 1S includes a pair of left and right lower rails 93 in addition to the left and right upper rails 91 and the coupling member 92 of FIG. 2.

The left lower rail 93 is provided to extend forwardly and obliquely downwardly from a lower portion in the vicinity of the rear end of the left upper rail 91. The right lower rail 93 is provided to extend forwardly and obliquely downwardly from a lower portion in the vicinity of the rear end of the right upper rail 91. The front ends of the left and right lower rails 93 are connected to the rear end of the main frame 1M of FIG. 1.

In an upper portion in the vicinity of the rear end portion of the left upper rail 91, two support members 70, 80 for supporting the rotation support mechanism 20L are provided to be arranged in the front-and-rear direction FB and spaced apart from each other. Each of the support members 70, 80 is fabricated by bending of a sheet of metal that is cut into a predetermined shape, for example, and connected to the upper rail 91 by welding. The left rotation support mechanism 20L is provided between the two support members 70, 80.

In a portion in the vicinity of the upper end of the right side portion of the left side case 10L, two attachment portions 11, 12 are formed to be arranged in the front-and-rear direction FB and spaced apart from each other. The left rotation support mechanism 20L is configured such that the two attachment portions 11, 12 of the left side case 10L are attachable to and detachable from the left rotation support mechanism 20L. With the two attachment portions 11, 12 of the side case 10L attached to the left rotation support mechanism 20L, the left rotation support mechanism 20L supports the left side case 10L to be rotatable about an axis AX1 extending in parallel with the central axis of the left upper rail 91.

Two support members 40L, 50L are attached to part of the left lower rail 93 to extend rearwardly and obliquely downwardly. The support member 40L is located at a position farther outward (leftward in the present example) than the support member 50L, and large portions of the support members 40L, 50L overlap with each other in the left-and-right direction LR. The two support members 40L, 50L may be provided to be in contact with each other or may be provided to be spaced apart from each other. Alternatively, the support members 40L, 50L may be integrally formed of a single member.

A footrest 41L is provided at the lower end portion of the support member 40L to be foldable. The folded footrest 41L is to be unfolded as indicated by the thick dotted arrow in FIG. 3. Thus, the rider who does not operate the motorcycle 100 can place his or her left foot on the unfolded footrest 41L while being seated on the rear half of the seat 9.

The lower end portion of the support member 50L is located forwardly of the lower end portion of the side case 10L attached to the rotation support mechanism 20L. The rotation attenuation mechanism 30L is provided at the lower end portion of the support member 50L. The rotation attenuation mechanism 30L includes a rotation member 420 provided to be rotatable about an axis AX3 that is different from the above-mentioned axis AX1. The axis AX3 extends in the up-and-down direction UD. Further, the rotation member 420 extends at least in the front-and-rear direction FB in a side view of the vehicle.

An insertion portion 13 is formed in a lower front end portion of the side case 10L. The insertion portion 13 of the side case 10L opens forwardly, and is configured such that the rear end portion of the rotation member 420 of the rotation attenuation mechanism 30L is insertable into the insertion portion 13 of the side case 10L from the front. The rotation attenuation mechanism 30L attenuates the rotation of the side case 10L about the axis AX1 with the rear end portion of the rotation member 420 inserted into the insertion portion 13 of the side case 10L. In the present embodiment, the left rotation attenuation mechanism 30L being connected to the lower front end portion of the left side case 10L means the rear end portion of the rotation member 420 being inserted into the insertion portion 13 of the side case 10L.

As described above, the left and right side cases 10L, 10R, the left and right rotation support mechanisms 20L, 20R and the left and right rotation attenuation mechanisms 30L, 30R respectively and basically have the symmetric structures about the central vertical planes. Therefore, the right side case 10R being attached to the sub-frame 1S is equal to the left side case 10L being attached to the sub-frame 1S of FIG. 3 and being inverted with respect to the central vertical plane.

Figure 4:
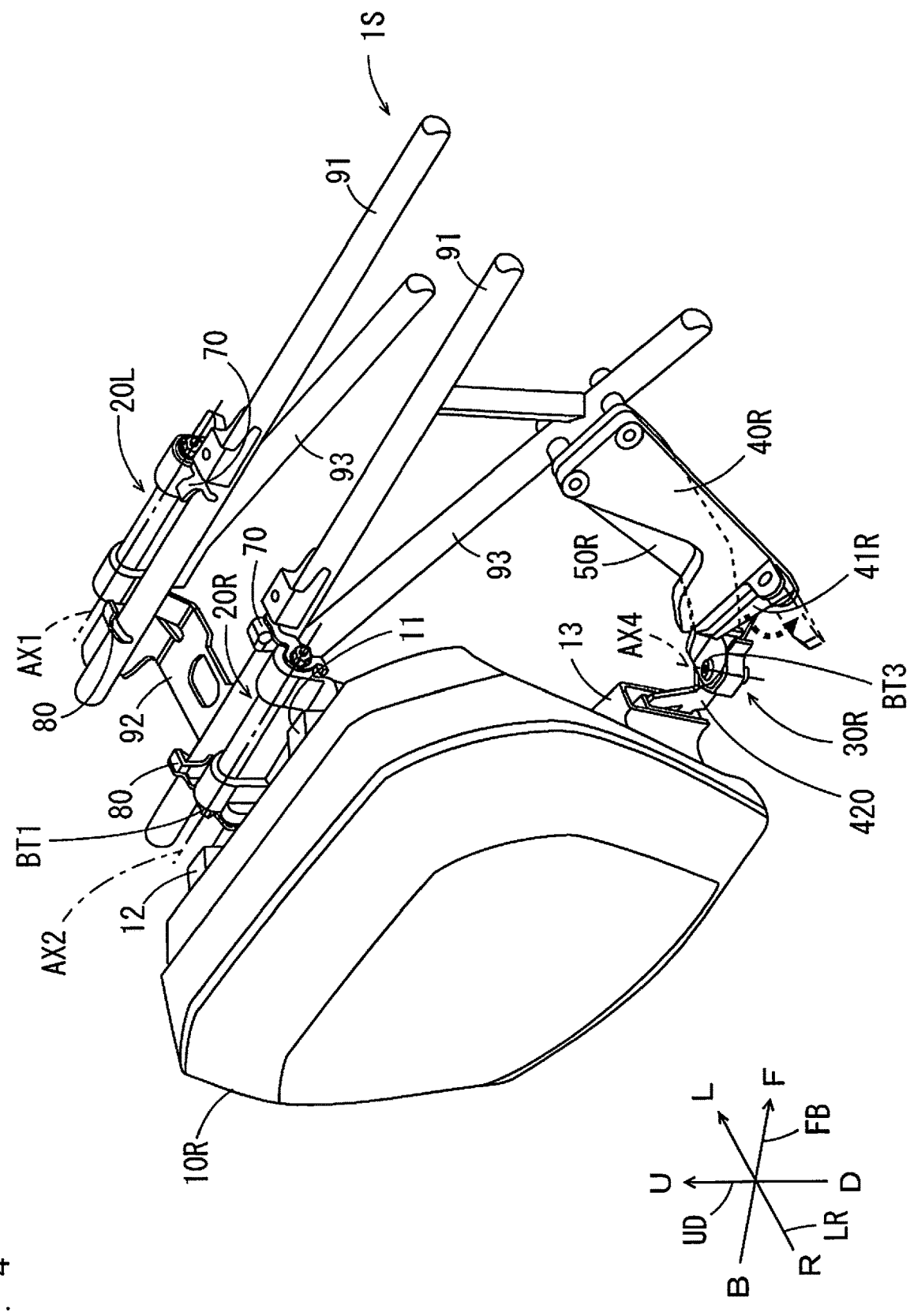
FIG. 4 is an external perspective view mainly showing the right side case being attached to the sub-frame.

FIG. 4 is an external perspective view mainly showing the right side case 10R being attached to the sub-frame 1S. Similarly to the example of the left upper rail 91, in an upper portion in the vicinity of the rear end portion the right upper rail 91, two support members 70, 80 for supporting the right rotation support mechanism 20R are provided to be arranged in the front-and-rear direction FB and spaced apart from each other. The right rotation support mechanism 20R is provided between the two support members 70, 80.

In a portion in the vicinity of the upper end of the left side portion of the right side case 10R, two attachment portions 11, 12 are formed. The right rotation support mechanism 20R is configured such that the two attachment portions 11, 12 of the right side case 10R are attachable to and detachable from the right rotation support mechanism 20R. With the two attachment portions 11, 12 of the side case 10R attached to the right rotation support mechanism 20R, the right rotation support mechanism 20R supports the right side case 10R to be rotatable about an axis AX2 extending in parallel with the central axis of the right upper rail 91.

Two support members 40R, 50R are attached to part of the right lower rail 93 to extend rearwardly and obliquely downwardly. The two support members 40R, 50R correspond to the two support members 40L, 50L of FIG. 3.

A footrest 41R is provided at the lower end portion of the support member 40R to be foldable. The folded footrest 41R is to be unfolded as indicated by the thick dotted arrow in FIG. 4. Thus, the rider who does not operate the motorcycle 100 can place his or her right foot on the unfolded footrest 41R while being seated on the rear half of the seat 9.

The lower end portion of the support member 50R is located forwardly of the lower end portion of the side case 10R attached to the rotation support mechanism 20R. The rotation attenuation mechanism 30R is provided at the lower end portion of the support member 50R. The rotation attenuation mechanism 30R includes a rotation member 420 provided to be rotatable about an axis AX4 that is different from the above-mentioned axis AX2. The axis AX4 extends in the up-and-down direction UD.

An insertion portion 13 is formed in a lower front end portion of the side case 10R similarly to the side case 10L. The insertion portion 13 of the side case 10R opens forwardly, and is configured such that the rear end portion of the rotation member 420 of the rotation attenuation mechanism 30R is insertable into the insertion portion 13 of the side case 10R from the front. The rotation attenuation mechanism 30R attenuates the rotation of the side case 10R about the axis AX2 with the rear end portion of the rotation member 420 inserted into the insertion portion 13 of the side case 10R. In the present embodiment, the right rotation attenuation mechanism 30R being connected to the lower front end portion of the right side case 10R means the rear end portion of the rotation member 420 being inserted into the insertion portion 13 of the side case 10R.

(2) Details of Structure of Rotation Support Mechanisms 20L, 20R

Figure 5:
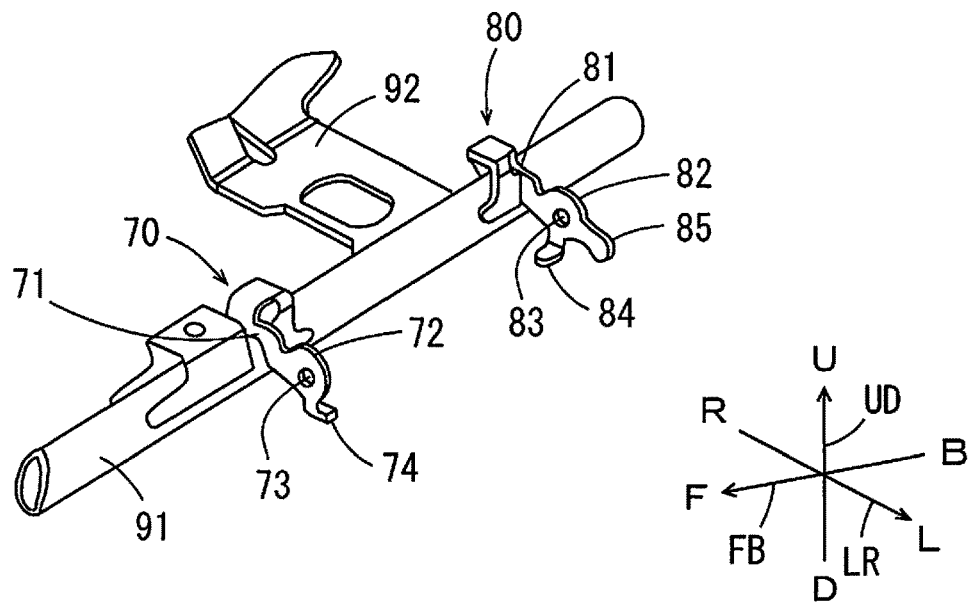
FIG. 5 is an external perspective view showing the configuration of a support member for supporting a left rotation support mechanism at a left upper rail.

Details of the structure of the left rotation support mechanism 20L and its peripheral members out of the rotation support mechanisms 20L, 20R will be representatively described. FIG. 5 is an external perspective view showing the configuration of the support members 70, 80 for supporting the left rotation support mechanism 20L at the left upper rail 91.

As shown in FIG. 5, the one support member 70 is provided forwardly of the other support member 80 and includes a connecting portion 71, a shaft support portion 72 and a rotation restricting portion 74. The connecting portion 71 is connected to the upper rail 91 by welding. The shaft support portion 72 projects leftwardly of the upper rail 91 by a certain distance with the connecting portion 71 connected to the upper rail 91. A through hole 73 penetrating in the front-and-rear direction FB is formed at the center of the shaft support portion 72. The rotation restricting portion 74 is formed in a lower end portion of the shaft support portion 72. The rotation restricting portion 74 extends downwardly from the lower end portion of the shaft support portion 72 and is further bent rearwardly.

The other support member 80 includes a connecting portion 81, a shaft support portion 82 and rotation restricting portions 84, 85. The connecting portion 81 is connected to the upper rail 91 by welding. The shaft support portion 82 projects leftwardly of the upper rail 91 by a certain distance with the connecting portion 81 connected to the upper rail 91. A through hole 83 penetrating in the front-and-rear direction FB is formed at the center of the shaft support portion 82. The rotation restricting portion 84 is formed in a lower end portion of the shaft support portion 82. The rotation restricting portion 84 extends downwardly from the lower end of the shaft support portion 82 and is further bent forwardly. Further, the rotation restricting portion 85 is formed in a left end portion of the shaft support portion 82. The rotation restricting portion 85 further extends leftwardly from the left end portion of the shaft support portion 82 by a certain distance. In the present embodiment, the straight line that connects the center of the through hole 73 formed in the support member 70 to the center of the through hole 83 formed in the support member 80 coincides with the axis AX1 of FIG. 3.

Figure 6:
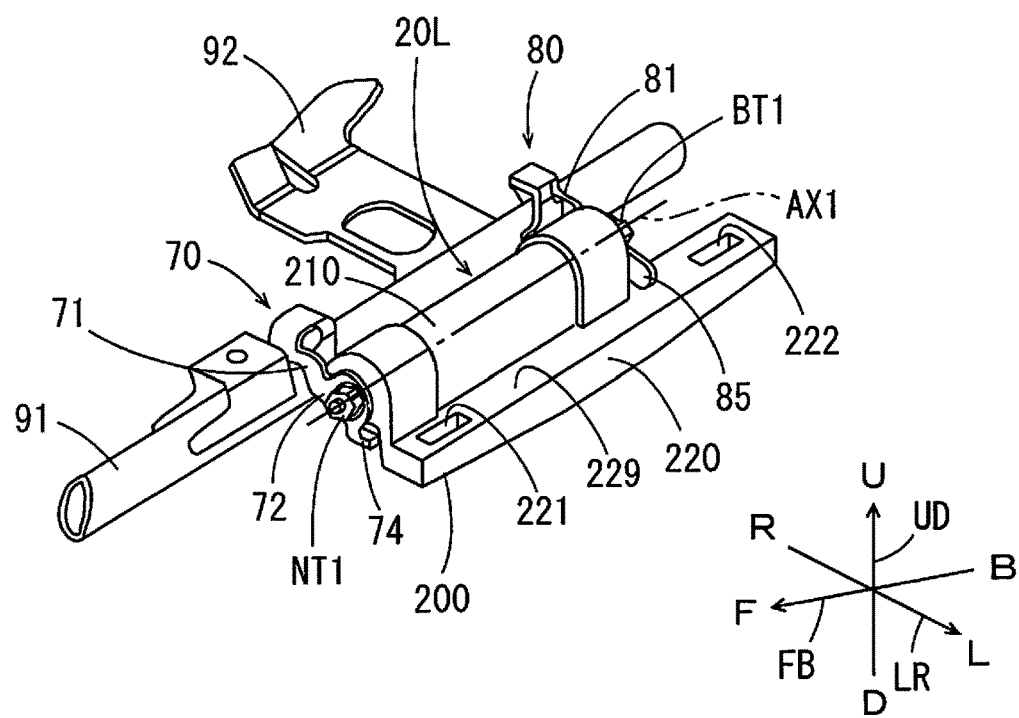
FIG. 6 is an external perspective view of the left rotation support mechanism attached between two support members of FIG. 5 as viewed from a position obliquely farther leftward and upward than the left rotation support mechanism.
Figure 7:
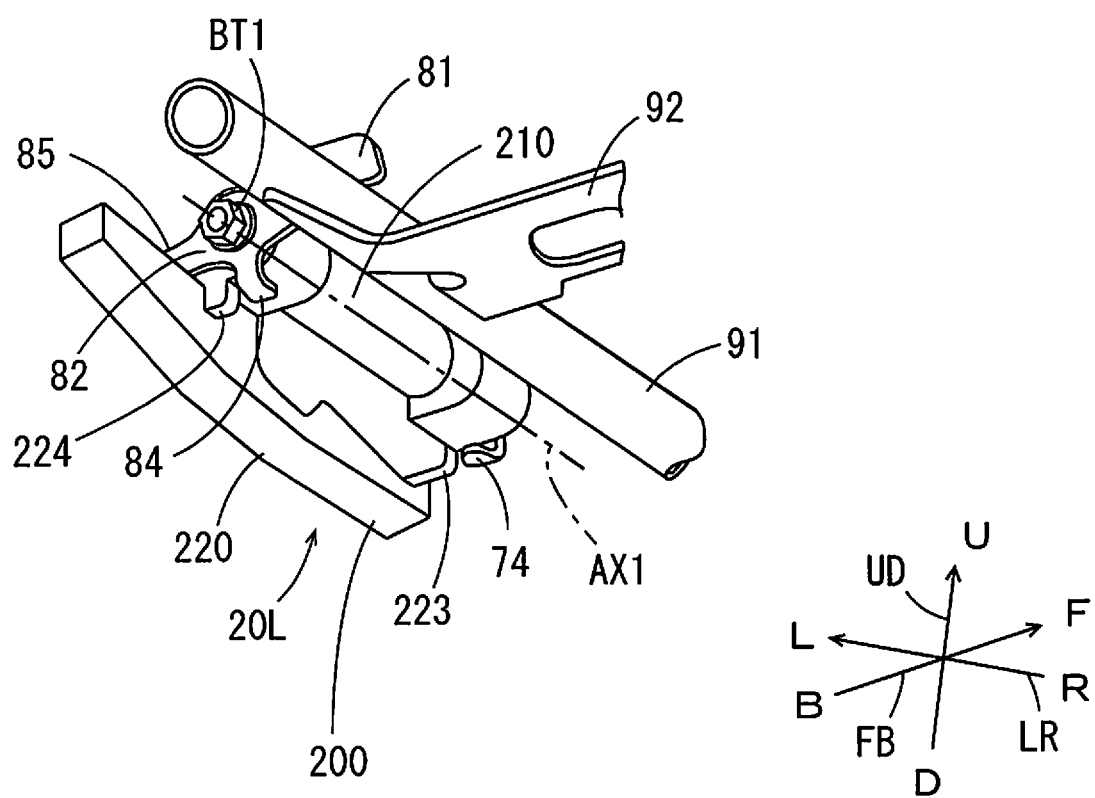
FIG. 7 is an external perspective view of the rotation support mechanism of FIG. 6 as viewed from a position obliquely farther rightward and downward than the rotation support mechanism.
Figure 8:
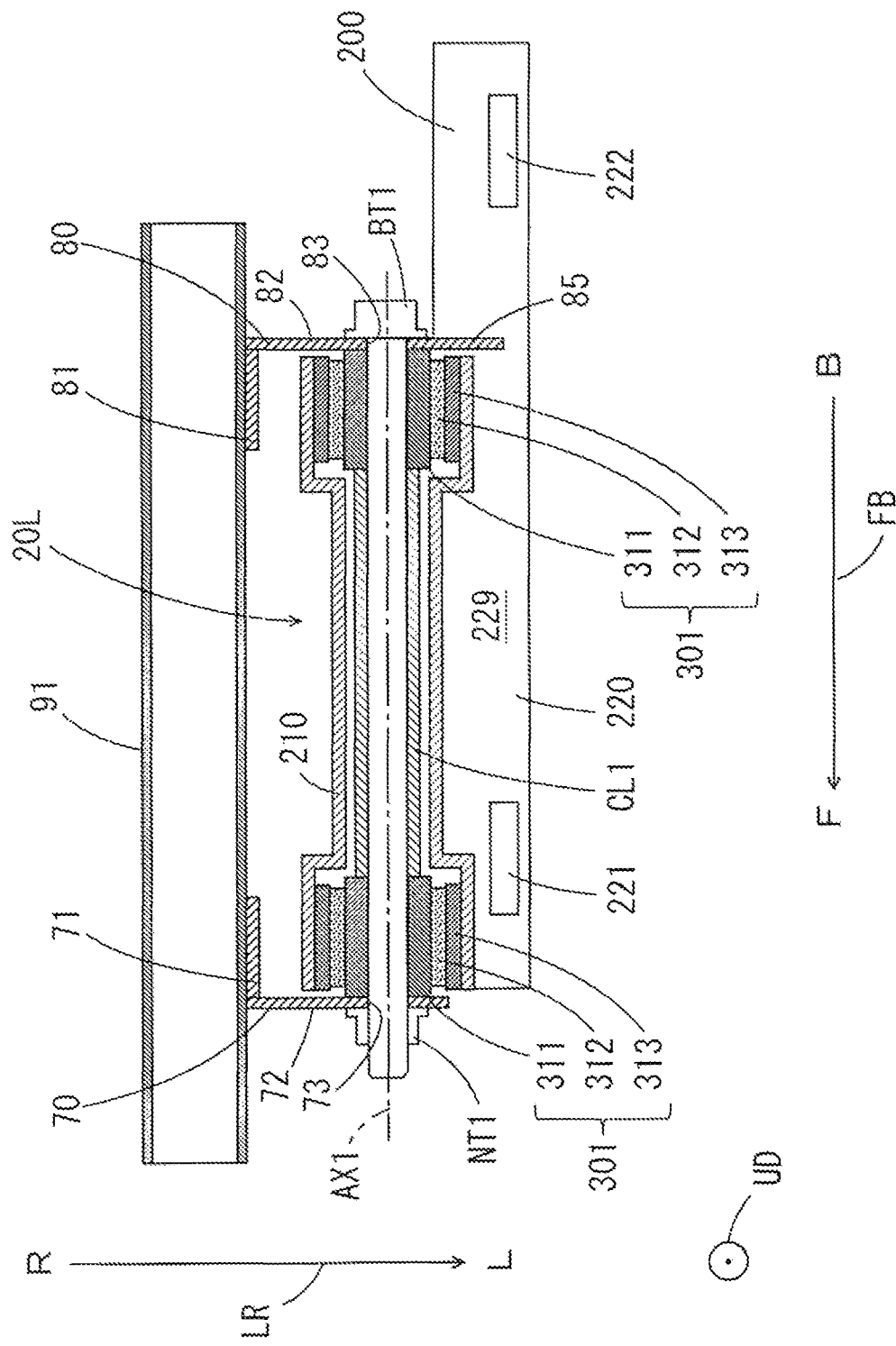
FIG. 8 is a cross sectional view of the upper rail and the rotation support mechanism of FIG. 6 as cut along a plane including central axes of left and right upper rails.

FIG. 6 is an external perspective view of the left rotation support mechanism 20L attached between the two support members 70, 80 of FIG. 5 as viewed from a position obliquely farther leftward and upward than the left rotation support mechanism 20L, and FIG. 7 is an external perspective view of the rotation support mechanism 20L of FIG. 6 as viewed from a position obliquely farther rightward and downward than the left rotation support mechanism 20L. FIG. 8 is a cross sectional view of the upper rail 91 and the rotation support mechanism 20L of FIG. 6 cut along the plane including the central axes of the left and right upper rails 91.

As shown in FIGS. 6 and 7, the rotation support mechanism 20L has a rotation member 200, a bolt BT1 and a nut NT1. The rotation member 200 includes a cylinder portion 210 and a support portion 220. The cylinder portion 210 has a cylindrical shape extending in one direction by a predetermined length and is arranged between the two support members 70, 80. The support portion 220 has a substantially prismatic shape, is integrally provided with one portion of the outer periphery of the cylinder portion 210 and is formed to further extend rearwardly by a certain distance beyond the rear end of the cylinder portion 210 from the front end of the cylinder portion 210.

Further, the support portion 220 has an upper surface 229 basically directed upwardly with the cylinder portion 210 arranged between the support members 70, 80. An attachment hole 221 is formed in the upper surface 229 in the vicinity of the front end portion of the support portion 220. Further, an attachment hole 222 is formed in the upper surface 229 in the vicinity of the rear end portion of the support portion 220. The attachment holes 221, 222 of FIG. 6 are formed such that the two attachment portions 11, 12 (FIG. 3) of the side case 10L are attachable to and detachable from the attachment holes 221, 222.

As shown in FIG. 8, two inner outer cylindrical dampers 301 are provided inside of the cylinder portion 210 at the both ends of the cylinder portion 210. Further, a collar member CL1 is provided between the two inner outer cylindrical dampers 301 in the inner space of the cylinder portion 210. Each inner outer cylindrical damper 301 includes an inner cylinder 311, a rubber bush 312 and an outer cylinder 313. The rubber bush 312 is provided to surround the outer peripheral surface of the inner cylinder 311, and the outer cylinder 313 is provided to surround the outer peripheral surface of the rubber bush 312. The inner cylinder 311 and the outer cylinder 313 are formed of metal, for example. The rubber bush 312 is baked on each of the outer peripheral surface of the inner cylinder 311 and the inner peripheral surface of the outer cylinder 313. Thus, the outer peripheral surface of the inner cylinder 311 and the inner peripheral surface of the outer cylinder 313 are bonded to each other via the rubber bush 312. The outer peripheral surface of the outer cylinder 313 is fixed to the inner peripheral surface of the cylinder portion 210 by crimping or welding or the like.

When the rotation support mechanism 20L is attached to the left upper rail 91, the cylinder portion 210 is arranged between the shaft support portion 72 of the support member 70 and the shaft support portion 82 of the support member 80. Further, the bolt BT1 is inserted into the cylinder portion 210 and the through hole 73 of the support member 70 through the through hole 83 from a position farther rearward than the support member 80. The bolt BT1 has a length that is larger than the distance between the support members 70, 80. Thus, in the inner space of the cylinder portion 210, the bolt BT1 is located inside of the two inner cylinders 311 and the collar member CL1. Further, the central axis of the bolt BT1 coincides with the axis AX1. In this state, the nut NT1 is attached to the tip of the bolt BT1 projecting forwardly of the support member 70. Thus, various members located between a head portion of the bolt BT1 and the nut NT1 are compressed, and the bolt BT1, the support members 70, 80, the collar member CL1 and the two inner cylinders 311 are integrally fixed. On the other hand, the two outer cylinders 313 fixed to the cylinder portion 210 are supported to be rotatable with respect to the two inner cylinders 311 while sandwiching the two rubber bushes 312.

With such a configuration, when the side case 10L attached to the rotation support mechanism 20L swings, the rotation member 200 of the rotation support mechanism 20L rotates about the axis AX1. In this case, between the bolt BT1 and the rotation member 200, a relative rotational force is generated around the axis AX1. Part of this rotational force is absorbed by the rubber bushes 312 of the two inner outer cylindrical dampers 301. Thus, the rotation (swinging) of the left side case 10L is attenuated.

As shown in FIG. 6, the rotation restricting portion 85 of the support member 80 is located upwardly and in the vicinity of the support portion 220 with the rotation support mechanism 20L attached to the left upper rail 91. Thus, when the support portion 220 rotates upwardly about the axis AX1, the upper surface 229 of the support portion 220 abuts against the rotation restricting portion 85. Thus, excessive rotation of the support portion 220 is restricted.

Further, as shown in FIG. 7, two projections 223, 224 are formed in portions of the support portion 220 located in the vicinity of the cylinder portion 210. The two projections 223, 224 are formed to respectively abut against the rotation restricting portion 74 of the support member 70 and the rotation restricting portion 84 of the support member 80 when the support portion 220 rotates downwardly about the axis AX1 by a certain angle or more. Thus, when the support portion 220 rotates downwardly about the axis AX1, excessive rotation of the support portion 220 is restricted by abutment of the two projections 223, 224 against the rotation restricting portions 74, 84. Thus, the side case 10L is prevented from swinging largely.

As described above, the right side case 10R being attached to the sub-frame 1S is equal to the left side case 10L being attached to the sub-frame 1S of FIG. 3 and being inverted with respect to the central vertical plane. Therefore, in a case where the right side case 10R is attached to the right rotation support mechanism 20R, the rotation of the side case 10R about the axis AX2 of the side case 10R is allowed, and the rotation (swinging) is attenuated by the rotation support mechanism 20R, similarly to the example of the left side case 10L.

(3) Details of Structure of Rotation Attenuation Mechanisms 30L, 30R

Figure 9:
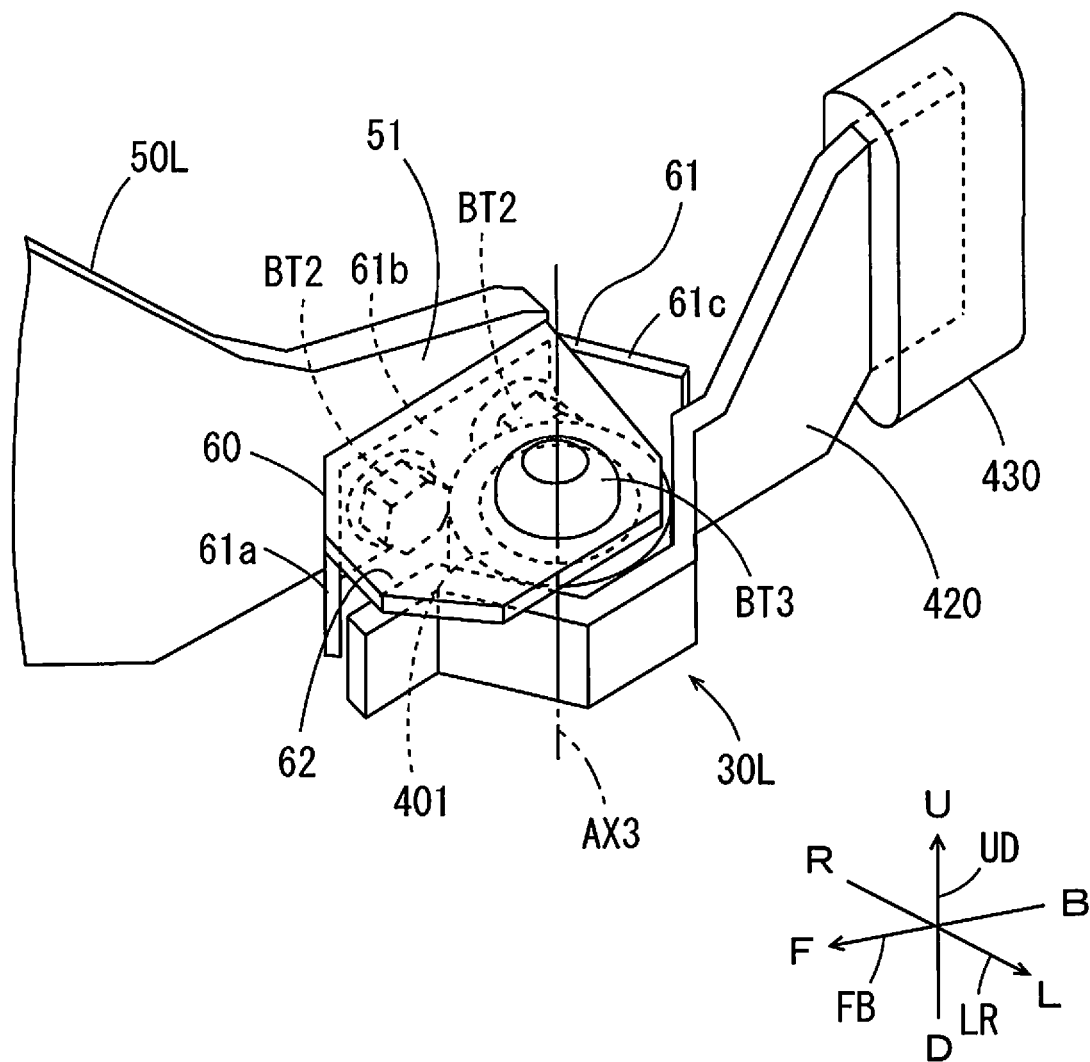
FIG. 9 is an external perspective view of the left rotation attenuation mechanism as viewed from a position obliquely farther leftward and upward than the left rotation attenuation mechanism.
Figure 10:
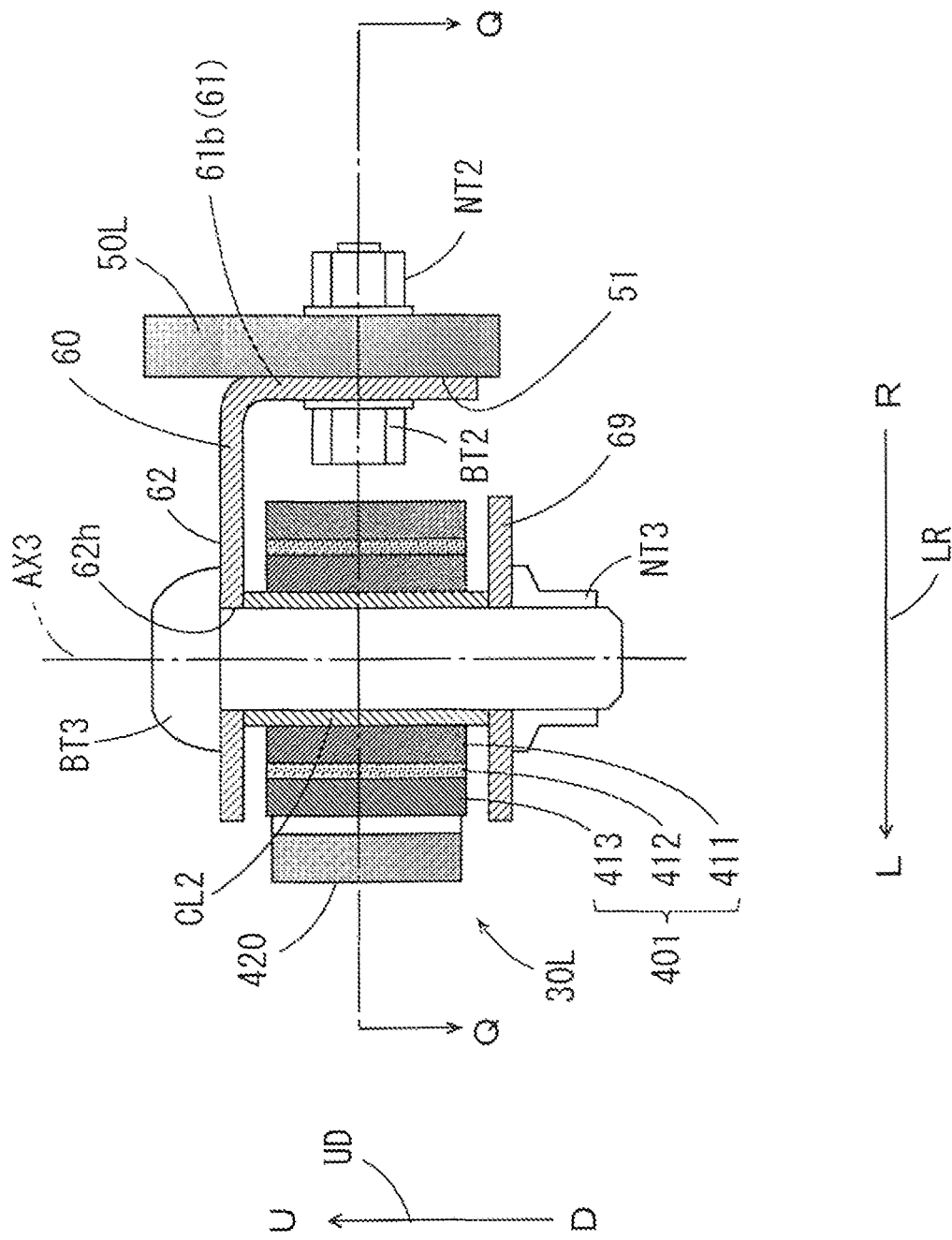
FIG. 10 is a cross sectional view of the rotation attenuation mechanism of FIG. 9 as cut along a vertical plane extending in a left-and-right direction.
Figure 11:
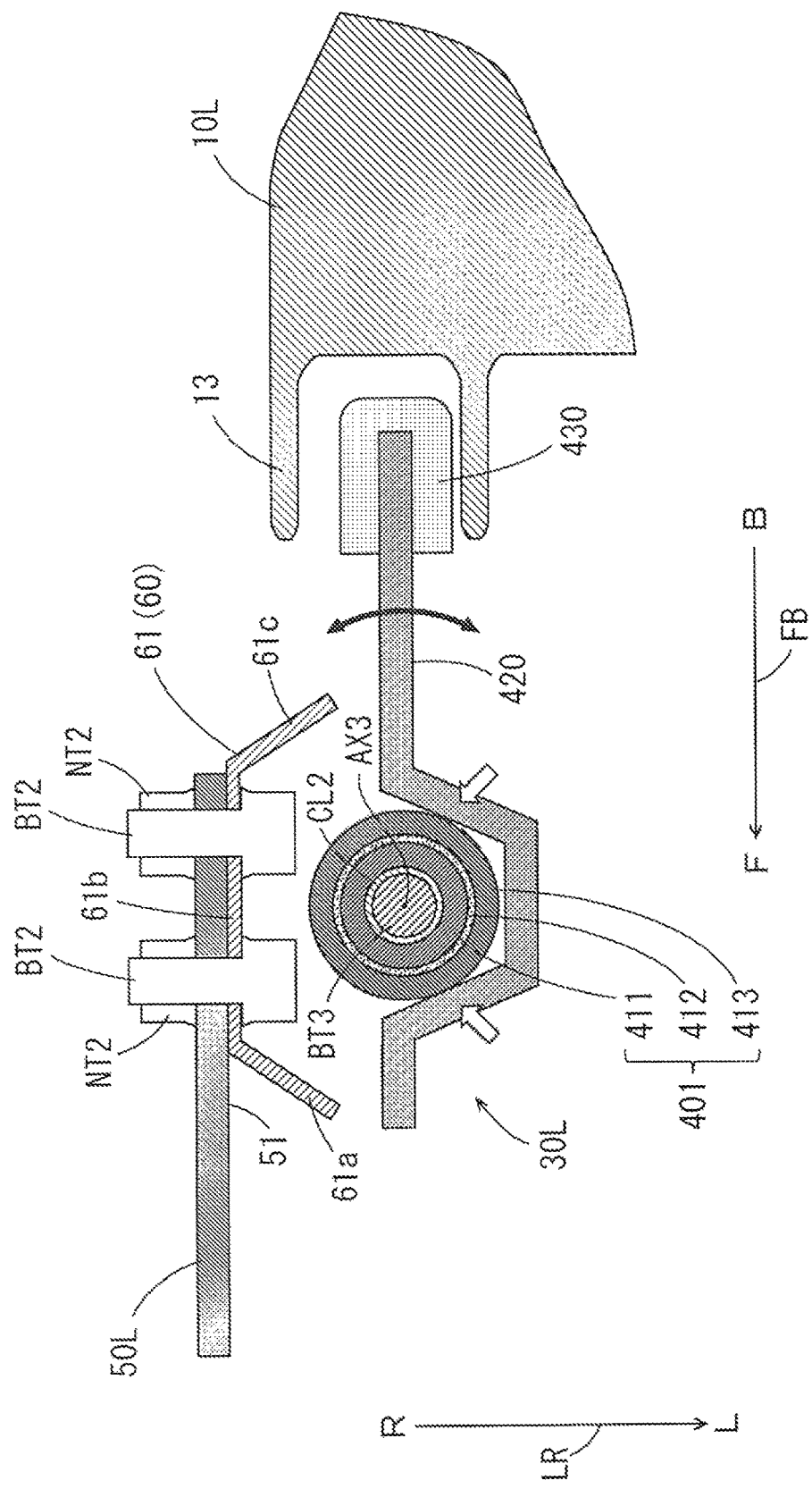
FIG. 11 is a cross sectional view taken along the line Q-Q of FIG. 10.

Details of the structure of the left rotation attenuation mechanism 30L and its peripheral member out of the rotation attenuation mechanisms 30L, 30R will be representatively described. FIG. 9 is an external perspective view of the left rotation attenuation mechanism 30L as viewed from a position obliquely farther leftward and upward than the left rotation attenuation mechanism 30L, FIG. 10 is a cross sectional view of the rotation attenuation mechanism 30L of FIG. 9 cut along a vertical plane extending in the left-and-right direction LR and FIG. 11 is a cross sectional view of the rotation attenuation mechanism 30L of FIG. 10 taken along the Q-Q line. In FIG. 11, the cross section of the side case 10L is partially shown in addition to the cross section of the rotation attenuation mechanism 30L.

The support member 50L is formed of a metallic plate member. As shown in FIG. 9, a lower portion of the support member 50L is positioned to be orthogonal to the left-and-right direction LR. The rotation attenuation mechanism 30L is attached to a surface 51 directed leftwardly in the lower end portion of the support member 50L.

The rotation attenuation mechanism 30L is mainly constituted by a support plate 60, an inner outer cylindrical damper 401, a rotation member 420, a cover member 430, a bolt BT3 and a nut NT3. The support plate 60 is fabricated by bending of a metal sheet that is cut into a predetermined shape, for example, and has a sidewall portion 61 and a ceiling portion 62.

The sidewall portion 61 has a shape in which an elongated plate member extending in one direction is bent in two portions. In the following description, three portions of the sidewall portion 61 sectioned by the two bending portions are respectively referred to as a first wall portion 61a, a second wall portion 61b and a third wall portion 61c. The second wall portion 61b is located between the first and third wall portions 61a, 61c. The first and third wall portions 61a, 61c are bent in the same direction with respect to the second wall portion 61b to face each other.

The ceiling portion 62 is formed to extend from the upper end portion of the second wall portion 61b in the same direction as the direction in which the first and third wall portions 61a, 61c are bent and cover the space between the first and third wall portions 61a, 61c from above. In the ceiling portion 62, a through hole 62h (FIG. 10) penetrating in the up-and-down direction UD is formed.

As shown in FIG. 11, the second wall portion 61b of the sidewall portion 61 is attached to the support member 50L using two bolts BT2 and two nuts NT2. Thus, the second wall portion 61b of the sidewall portion 61 is in contact with the surface 51 of the support member 50L as shown in FIG. 10. Further, the ceiling portion 62 extends horizontally and leftwardly from the upper end portion of the second wall portion 61b.

A bolt BT3 is inserted into the through hole 62h of the ceiling portion 62 from above, and the inner outer cylindrical damper 401 is attached to a portion of the bolt BT3 located below the ceiling portion 62 with a collar member CL2 held therebetween. At this time, the central axis of the bolt BT3 coincides with the axis AX3.

The inner outer cylindrical damper 401 basically has the same configuration as the inner outer cylindrical damper 301 and includes an inner cylinder 411, a rubber bush 412 and an outer cylinder 413. The rubber bush 412 is provided to surround the outer peripheral surface of the inner cylinder 411, and the outer cylinder 413 is provided to surround the outer peripheral surface of the rubber bush 412. The inner cylinder 411 and the outer cylinder 413 are formed of metal, for example. The rubber bush 412 is baked on each of the outer peripheral surface of the inner cylinder 411 and the inner peripheral surface of the outer cylinder 413. Thus, the outer peripheral surface of the inner cylinder 411 and the inner peripheral surface of the outer cylinder 413 are bonded to each other via the rubber bush 412.

An annular member 69 is further attached to the bolt BT3 to come into contact with the lower end portion of the collar member CL2. The nut NT3 is attached to the tip portion of the bolt BT3 projecting downwardly of the annular member 69. Thus, various members located between a head portion of the bolt BT3 and the nut NT3 is compressed, and the bolt BT3, the ceiling portion 62, the collar member CL2, the annular member 69 and the inner cylinder 411 are integrally fixed. On the other hand, the outer cylinder 413 is supported to be rotatable with respect to the inner cylinder 411 with the rubber bush 412 sandwiched therebetween.

The rotation member 420 has a shape in which an elongated metal plate extending in one direction is bent in a plurality of portions. Part of the rotation member 420 is connected to the outer cylinder 413 of the inner outer cylindrical damper 401 by welding, for example. In FIG. 11, connecting portions between the rotation member 420 and the outer cylinder 413 are indicated by the outlined arrows. Thus, the rotation member 420 is rotatable about the axis AX3 with the inner outer cylindrical damper 401 attached to the support plate 60.

The inner outer cylindrical damper 401 is attached to the support plate 60 such that the rotation member 420 basically extends in the front-and-rear direction FB. The cover member 430 is attached to the rear end portion of the rotation member 420. The cover member 430 is formed of rubber or resin, for example, and protects the rear end portion of the rotation member 420 and the insertion portion 13 of the side case 10L into which the rotation member 420 is to be inserted.

As shown in FIG. 11, the rear end portion of the rotation member 420 is inserted into the insertion portion 13 of the side case 10L. With such a configuration, when the insertion portion 13 moves in the left-and-right direction LR due to swinging of the side case 10L of FIG. 3 around the axis AX1, the rotation member 420 rotates about the axis AX3. In this case, between the bolt BT3 and the rotation member 420, a relative rotational force is generated around the axis AX3. Part of this rotational force is absorbed by the rubber bush 412 of the inner outer cylindrical damper 401. Thus, rotation (swinging) of the left side case 10L is attenuated.

As described above, the right side case 10R being attached to the sub-frame 1S is equal to the left side case 10L being attached to the sub-frame 1S of FIG. 3 and being inverted with respect to the central vertical plane. Therefore, in a case where the right side case 10R is attached to the right rotation support mechanism 20R, the rotation of the side case 10R about the axis AX2 is allowed, and the rotation (swinging) is attenuated by the rotation attenuation mechanism 30R, similarly to the example of the left side case 10L.

[3] Attachment to and Detachment from Side Cases 10L, 10R

Figure 12:
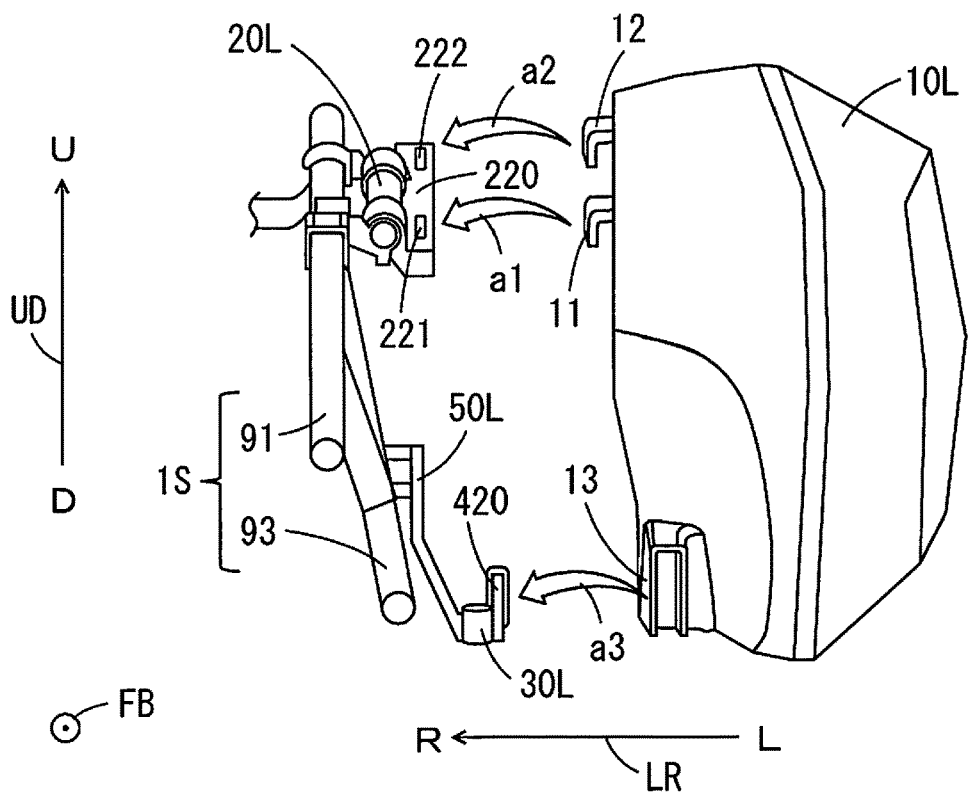
FIG. 12 is a diagram for explaining attachment and detachment of the side case with respect to the sub-frame.
Figure 13:
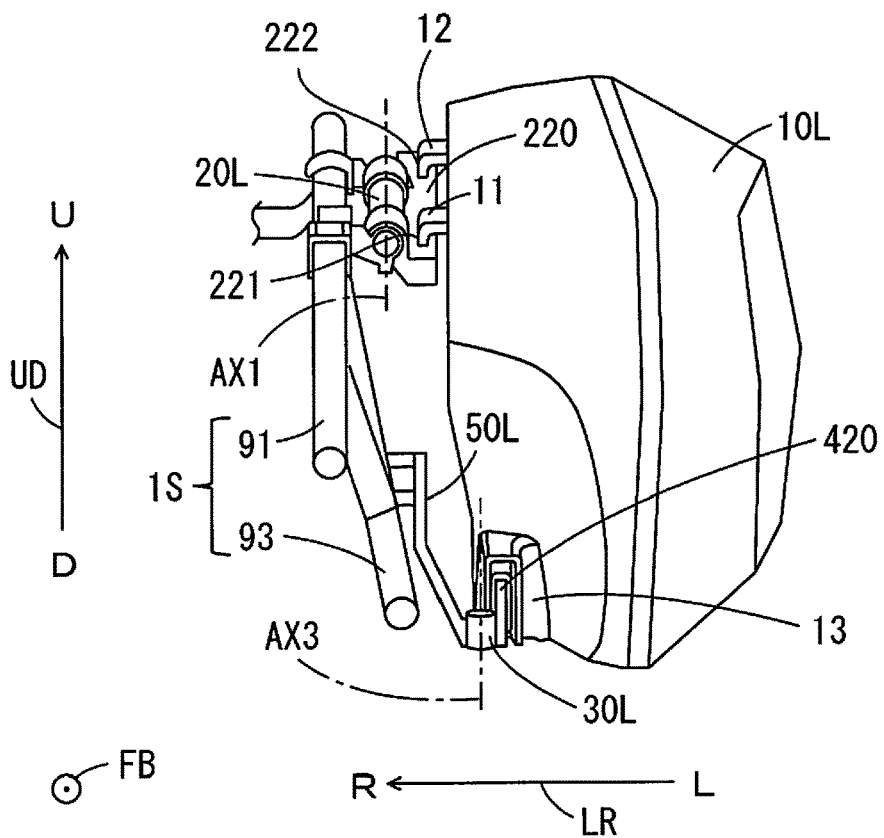
FIG. 13 is a diagram for explaining attachment and detachment of the side case with respect to the sub-frame.

FIGS. 12 and 13 are diagrams for explaining attachment and detachment of the side case 10L to and from the sub-frame 1S. In FIG. 12, the side case 10L being detached from the left upper rail 91 is shown. As indicated by the outlined arrows a1, a2 in FIG. 12, with the side case 10L detached from the sub-frame 1S, the attachment portions 11, 12 of the side case 10L are inserted into the attachment holes 221, 222 of the rotation support mechanism 20L. Further, as indicated by the outlined arrow a3 in FIG. 12, the rear end portion of the rotation member 420 of the rotation attenuation mechanism 30L is inserted into the insertion portion 13 of the side case 10L. Thus, as shown in FIG. 13, the side case 10L is attached to the sub-frame 1S.

On the other hand, with the side case 10L attached to the sub-frame 1S, the attachment portions 11, 12 of the side case 10L are pulled out of the attachment holes 221, 222 of the rotation support mechanism 20L. Further, the rear end portion of the rotation member 420 of the rotation attenuation mechanism 30L is pulled out of the insertion portion 13 of the side case 10L. Thus, the side case 10L is detached from the sub-frame 1S.

The right side case 10R can also be attached to and detached from the sub-frame 1S in the procedure similar to that of the example of the left side case 10L of FIGS. 12 and 13.

[4] Effects (1) In the above-mentioned motorcycle 100, with the left side case 10L attached to the body frame 1, an upper portion of the side case 10L is supported at the body frame 1 by the left rotation support mechanism 20L to be rotatable about the axis AX1. In this case, because rotation of the left side case 10L with respect to the body frame 1 is allowed, the left side case 10L swings around the axis AX1 during travelling of the vehicle.

The rear end portion of the rotation member 420 of the rotation attenuation mechanism 30L is inserted into the insertion portion 13 of the left side case 10L. The rotation member 420 is supported by the bolt BT3 fixed to the support member 50L and the support plate 60 to be rotatable about the axis AX3. The inner outer cylindrical damper 401 is provided between the rotation member 420 and the bolt BT3. When the left side case 10L swings, the rotation member 420 rotates about the axis AX3. At this time, part of the relative rotational force generated around the axis AX3 between the rotation member 420 and the bolt BT3 is absorbed by the inner outer cylindrical damper 401. Thus, the rotation of the left side case 10L is attenuated. At this time, the inner outer cylindrical damper 401 functions as a dynamic damper with respect to rotational vibration of the left side case 10L.

With the right side case 10R attached to the body frame 1, the upper portion of the side case 10R is supported at the body frame 1 by the right rotation support mechanism 20R to be rotatable about the axis AX2. In this case, because rotation of the right side case 10R with respect to the body frame 1 is allowed, the right side case 10R swings about the axis AX2 during travelling of the vehicle.

The rear end portion of the rotation member 420 of the rotation attenuation mechanism 30R is inserted into the insertion portion 13 of the right side case 10R. The rotation member 420 is supported by the bolt BT3 fixed to the support member 50R and the support plate 60 to be rotatable about the axis AX4. The inner outer cylindrical damper 401 is provided between the rotation member 420 and the bolt BT3. When the right side case 10R swings, the rotation member 420 rotates about the axis AX4. At this time, part of the relative rotational force generated around the axis AX4 between the rotation member 420 and the bolt BT3 is absorbed by the inner outer cylindrical damper 401 provided at the rotation attenuation mechanism 30R. Thus, rotation of the right side case 10R is attenuated. At this time, the inner outer cylindrical damper 401 functions as a dynamic damper with respect to rotational vibration of the right side case 10R.

In this manner, in the above-mentioned motorcycle 100, with the left and right side cases 10L, 10R attached to the body frame 1, rotation of each side case 10L, 10R is allowed. Further, rotation of the side case 10L is attenuated by the inner outer cylindrical damper 401 of the rotation attenuation mechanism 30L, and rotation of the side case 10R is attenuated by the inner outer cylindrical damper of the rotation attenuation mechanism 30R. In each of the inner outer cylindrical dampers 401 of the rotation attenuation mechanisms 30L, 30R, an attenuation force corresponding to the magnitude of rotation of the rotation member 420 is generated.

Further, in the above-mentioned motorcycle 100, the left and right side cases 10L, 10R are respectively independently attached to the body frame 1. Thus, even in a case where one side case of the left and right side cases 10L, 10R rotates, the other side case does not operate in connection with the rotation of the one side case. With such a configuration, even in a case where different rotational forces are respectively generated in the left and right side cases 10L, 10R when the motorcycle 100 tilts leftwardly or rightwardly when turning, for example, the one side case is not affected by the rotation of the other side case. Therefore, the rotation of each of the left and right side cases 10L, 10R is attenuated in a short period of time in accordance with the magnitude of rotation. Thus, swinging of the vehicle caused by swinging of the left and right side cases 10L, 10R is reduced in a short period of time.

As a result, it is possible to suppress generation of the weave mode while increasing the luggage capacity.

(2) Further, in the above-mentioned rotation support mechanism 20L, the inner outer cylindrical damper 301 is provided between the bolt BT1 that is fixed to the left upper rail 91 and the rotation member 200. When the left side case 10L attached to the body frame 1 swings, the rotation member 200 rotates about the axis AX1. At this time, part of the relative rotational force generated around the axis AX1 between the rotation member 200 and the bolt BT1 is absorbed by the inner outer cylindrical damper 301 provided at the rotation support mechanism 20L. Thus, when the left side case 10L rotates, the rotation is further attenuated.

Further, in the above-mentioned rotation support mechanism 20R, the inner outer cylindrical damper 301 is provided between the bolt BT1 that is fixed to the right upper rail 91 and the rotation member 200. When the right side case 10R attached to the body frame 1 swings, the rotation member 200 rotates about the axis AX2. At this time, part of the relative rotational force generated around the axis AX2 between the rotation member 200 and the bolt BT1 is absorbed by the inner outer cylindrical damper 301 provided at the rotation support mechanism 20R. Thus, when the right side case 10R rotates, the rotation is further attenuated.

(3) In the above-mentioned motorcycle 100, each of the bolts BT3 supporting the rotation members 420 of the rotation attenuation mechanisms 30L, 30R is fixed to the body frame 1 by the support plate 60 and the support members 50L, 50R. In this case, because the supporting state of the rotation attenuation mechanisms 30L, 30R in the motorcycle 100 is stabilized, the rotation of the left and right side cases 10L, 10R can be appropriately attenuated by the inner outer cylindrical dampers 401.

[5] Confirmation Test

With the above-mentioned motorcycle 100 taken as a motorcycle for an inventive example, the inventors of the present invention conducted a test for confirming the suppression effect of the weave mode generated during travelling at high speed in regard to the motorcycle of the inventive example. In this test, the motorcycle of the inventive example traveled at high speed, and a roll rate and a yaw rate of the vehicle were measured.

Figure 14:
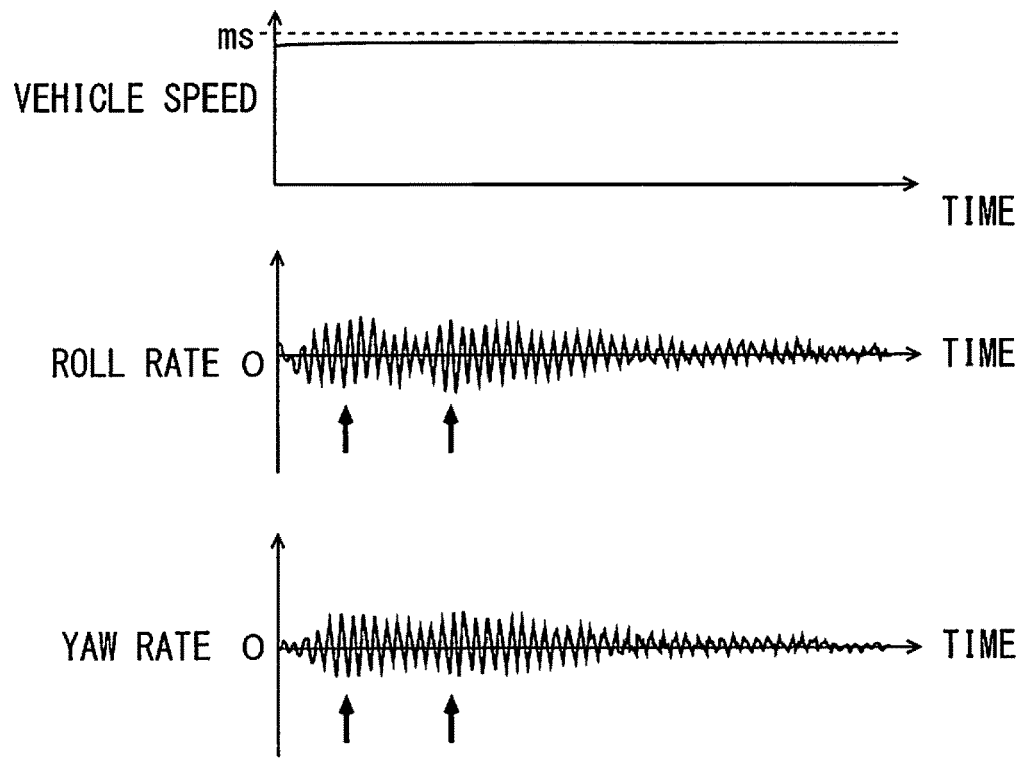
FIG. 14 is a diagram showing a result of confirmation test of the weave mode in regard to a motorcycle of an inventive example.

FIG. 14 is a diagram showing the result of confirmation test of the weave mode in regard to the motorcycle of the inventive example. In FIG. 14, the ordinate of the upper graph indicates the speed of the vehicle, the ordinate of the middle graph indicates the roll rate, and the ordinate of the lower graph indicates the yaw rate. Further, the abscissa of each graph indicates the time. Further, in the upper graph, "ms" indicates the speed (hereinafter referred to as a speed limit) that is estimated to be reachable when the motorcycle 100 travels with maximum output.

With the motorcycle 100 of the inventive example, even in a case where the motorcycle 100 travels at the speed substantially equal to the speed limit, generation of the weave mode was hardly recognized. That is, the measured roll rate and yaw rate were almost 0.

As such, in the confirmation test of the inventive example, the roll rate and the yaw rate were changed deliberately by a rider who provided impact to the motorcycle 100 during traveling of the vehicle. In the middle and lower graphs, impact is provided to the vehicle at the points in time indicated by the thick arrows.

As shown in the middle and lower graphs of FIG. 14, although fluctuation of the roll rate and the yaw rate was large temporarily due to provision of impact to the vehicle in the motorcycle 100 of the inventive example, the fluctuation is reduced in a short period of time.

Further, the inventors of the present invention fabricated a motorcycle 100 having the same configuration as the above-mentioned motorcycle 100 except that three portions of each of the side cases 10L, 10R were directly fixed to the body frame 1 as the motorcycle of a comparative example. The three portions of each of the side cases 10L, 10R are attachment portions 11, 12 and an insertion portion 13, for example. Further, the inventors of the present invention conducted a test for confirming the suppression effect of the weave mode generated during traveling at high speed in regard to the fabricated motorcycle of the comparative example.

Figure 15:
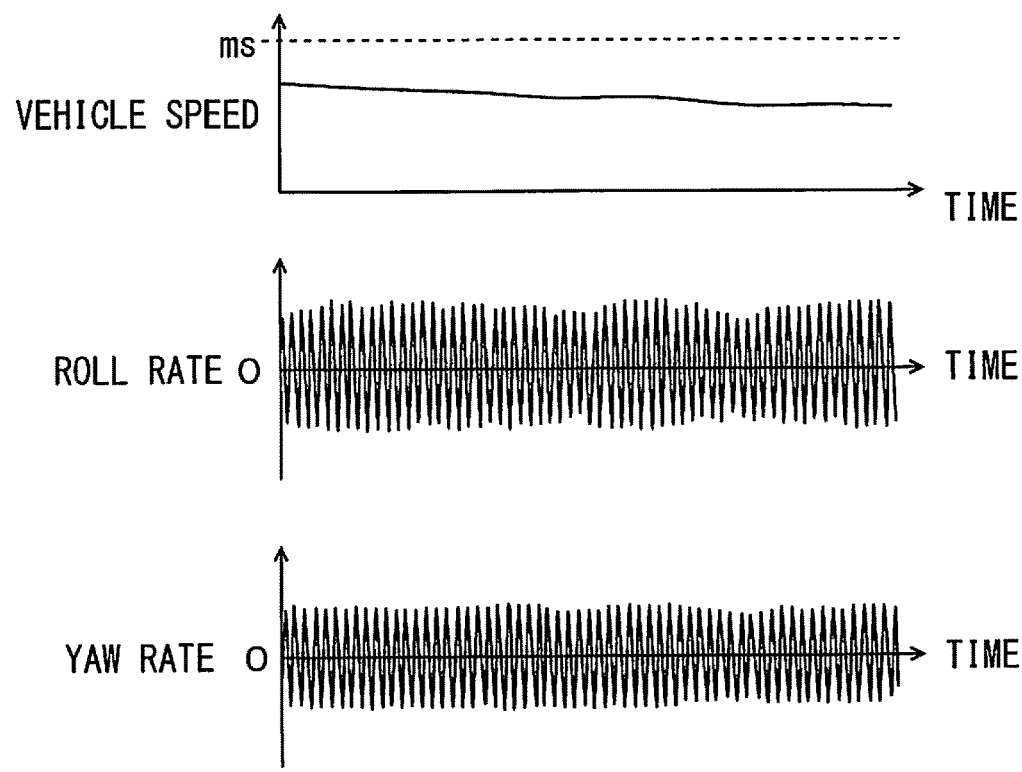
FIG. 15 is a diagram showing a result of confirmation test of the weave mode in regard to a motorcycle of a comparative example.

FIG. 15 is a diagram showing the result of confirmation test of the weave mode in regard to the motorcycle of the comparative example. The three graphs shown in FIG. 15 respectively correspond to the three graphs of FIG. 14. Further, the display range of the ordinate of each graph of FIG. 15 is equal to the display range of the ordinate of the corresponding graph of FIG. 14.

In the motorcycle of the comparative example, the relatively large weave mode was generated at a speed lower than the speed limit. As shown in the middle and lower graphs of FIG. 15, the roll rate and the yaw rate measured during travelling fluctuated significantly largely. Thus, the vehicle speed could not be increased to be close to the speed limit.

From the result of the above-mentioned confirmation test, it was found that the weave mode generated in the vehicle was sufficiently reduced in a case where each of the left and right side cases 10L, 10R was attached to the body frame 1 to be rotatable in the left-and-right direction LR and capable of attenuating the rotation.

[6] Other Embodiments (1) While the inner outer cylindrical damper 301 is provided in each of the rotation support mechanisms 20L, 20R in the motorcycle 100 according to the above-mentioned embodiment, the present invention is not limited to this. Each rotation support mechanism 20L, 20R may be configured such that the side case 10L, 10R attached to the rotation member 200 is rotatably supported with respect to the upper rail 91. Therefore, the inner outer cylindrical damper 301 does not have to be provided at each of the rotation support mechanisms 20L, 20R. In this case, the configuration of the rotation support mechanisms 20L, 20R is simplified.

(2) While the axis AX1 extends in parallel with the central axis of the left upper rail 91 in the motorcycle 100 according to the above-mentioned embodiment, the present invention is not limited to this. The direction in which the axis AX1 extends may be inclined with respect to the central axis of the left upper rail 91. Further, while the axis AX2 extends in parallel with the central axis of the right upper rail 91 in the motorcycle 100 according to the above-mentioned embodiment, the present invention is not limited to this. The direction in which the axis AX2 extends may be inclined with respect to the central axis of the right upper rail 91.

(3) While the rubber bush 412 is provided at the inner outer cylindrical damper 401 provided at each of the above-mentioned rotation attenuation mechanisms 30L, 30R to absorb a rotational force generated between the bolt BT3 and the rotation member 420, the present invention is not limited to this. In the inner outer cylindrical damper 401, another elastic member such as a spring may be provided instead of the rubber bush 412 as the configuration for absorbing a rotational force generated between the bolt BT3 and the rotation member 420.

(4) While the rubber bush 312 is provided at the inner outer cylindrical damper 301 provided at each of the above-mentioned rotation support mechanisms 20L, 20R to absorb a rotational force generated between the bolt BT1 and the rotation member 200, the present invention is not limited to this. In the inner outer cylindrical damper 301, another elastic member such as a spring may be provided instead of the rubber bush 312 as the configuration for absorbing a rotational force generated between the bolt BT1 and the rotation member 200.

(5) While the insertion portion 13 is formed in the lower front end portion of each of the left and right side cases 10L, 10R and each of the rotation attenuation mechanisms 30L, 30R is arranged forwardly of the insertion portion 13 in the motorcycle 100 according to the above-mentioned embodiment, the present invention is not limited to this. The insertion portion 13 may be formed in the lower rear end portion of each of the left and right side cases 10L, 10R, and each of the rotation attenuation mechanisms 30L, 30R may be arranged rearwardly of the insertion portion 13.

(6) While the above-mentioned embodiment is an example in which the present invention is applied to the motorcycle, the invention is not limited to this. The present invention may be applied to another straddled vehicle such as a four-wheeled automobile, a motor tricycle or an ATV (All Terrain Vehicle).

[7] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the body frame 1 is an example of a body frame, the left side case 10L is an example of a left side case, the right side case 10R is an example of a right side case, the axis AX1 is an example of a first axis, the left rotation support mechanism 20L is an example of a left rotation supporter, the left rotation attenuation mechanism 30L is an example of a left rotation attenuator, the axis AX2 is an example of a second axis, the right rotation support mechanism 20R is an example of a right rotation supporter, the right rotation attenuation mechanism 30R is an example of a right rotation attenuator.

Further, the axis AX3 is an example of a third axis, the bolt BT3 of the rotation attenuation mechanism 30L is an example of a first rotation shaft member, the rotation member 420 of the rotation attenuation mechanism 30L is an example of a first rotation member, the inner outer cylindrical damper 401 of the rotation attenuation mechanism 30L is an example of a first inner outer cylindrical damper, the axis AX4 is an example of a fourth axis, the bolt BT3 of the rotation attenuation mechanism 30R is an example of a second rotation shaft member, the rotation member 420 of the rotation attenuation mechanism 30R is an example of a second rotation member, and the inner outer cylindrical damper 401 of the rotation attenuation mechanism 30R is an example of a second inner outer cylindrical damper.

Further, the inner cylinder 411 of the rotation attenuation mechanism 30L is an example of a first inner cylinder, the rubber bush 412 of the rotation attenuation mechanism 30L is an example of a first rubber bush, the outer cylinder 413 of the rotation attenuation mechanism 30L is an example of a first outer cylinder, the inner cylinder 411 of the rotation attenuation mechanism 30R is an example of a second inner cylinder, the rubber bush 412 of the rotation attenuation mechanism 30R is an example of a second rubber bush, and the outer cylinder 413 of the rotation attenuation mechanism 30R is an example of a second outer cylinder.

Further, the bolt BT1 of the rotation support mechanism 20L is an example of a third rotation shaft member, the rotation member 200 of the rotation support mechanism 20L is an example of a third rotation member, the inner outer cylindrical damper 301 of the rotation support mechanism 20L is an example of a third inner outer cylindrical damper, the bolt BT1 of the rotation support mechanism 20R is an example of a fourth rotation shaft member, the rotation member 200 of the rotation support mechanism 20R is an example of a fourth rotation member, and the inner outer cylindrical damper 301 of the rotation support mechanism 20R is an example of a fourth inner outer cylindrical damper.

Further, the inner cylinder 311 of the rotation support mechanism 20L is an example of a third inner cylinder, the rubber bush 312 of the rotation support mechanism 20L is an example of a third rubber bush, the outer cylinder 313 of the rotation support mechanism 20L is an example of a third outer cylinder, the inner cylinder 311 of the rotation support mechanism 20R is an example of a fourth inner cylinder, the rubber bush 312 of the rotation support mechanism 20R is an example of a fourth rubber bush, the outer cylinder 313 of the rotation support mechanism 20R is an example of a fourth outer cylinder, the insertion portion 13 of the side case 10L is an example of a first insertion portion, and the insertion portion 13 of the side case 10R is an example of a second insertion portion.

As each of constituent elements recited in the claims, various other elements having configurations or functions described in the claims can be also used.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

What is claimed is:

1. A straddled vehicle, comprising:
a body frame that extends in a front-and-rear direction of the straddled vehicle;
a left side case and a right side case that are in a pair and are configured to be attachable to and detachable from left and right side portions of the body frame, respectively;
a left rotation supporter that supports an upper portion of the left side case at the body frame when the left side case is attached to the body frame such that the left side case is rotatable about a first axis and with respect to the body frame while;
a left rotation attenuator that attenuates rotation of the left side case about the first axis;
a right rotation supporter that supports an upper portion of the right side case at the body frame when the right side case is attached to the body frame such that the right side case is rotatable about a second axis and with respect to the body frame; and
a right rotation attenuator that attenuates rotation of the right side case about the second axis, wherein
the left rotation attenuator includes
a first rotation shaft member that extends in a direction of a third axis that is different from a direction of the first axis,
a first rotation member connected to a lower portion of the left side case, and being supported by the first rotation shaft member when the left side case is attached to the body frame such that the first rotation member is rotatable about the third axis, and
a first inner outer cylindrical damper provided between the first rotation shaft member and the first rotation member, and
the right rotation attenuator includes
a second rotation shaft member that extends in a direction of a fourth axis that is different from a direction of the second axis,
a second rotation member connected to a lower portion of the right side case, and being supported by the second rotation shaft member when the right side case is attached to the body frame such that the second rotation member is rotatable about the fourth axis, and
a second inner outer cylindrical damper provided between the second rotation shaft member and the second rotation member.

2. The straddled vehicle according to claim 1, wherein
each of the first and second axes extends in the front-and-rear direction of the straddled vehicle, and
each of the third and fourth axes extends in an up-and-down direction of the straddled vehicle.

3. The straddled vehicle according to claim 1, wherein
each of the first and second rotation shaft members is fixed to the body frame.

4. The straddled vehicle according to claim 1, wherein
the first inner outer cylindrical damper includes
a first inner cylinder into which the first rotation shaft member is inserted,
a first rubber bush provided to surround an outer peripheral surface of the first inner cylinder, and
a first outer cylinder provided to surround the first rubber bush, and being fixed to the first rotation member, and
the second inner outer cylindrical damper includes
a second inner cylinder into which the second rotation shaft member is inserted,
a second rubber bush provided to surround an outer peripheral surface of the second inner cylinder, and
a second outer cylinder provided to surround the second rubber bush, and being fixed to the second rotation member.

5. The straddled vehicle according to claim 1, wherein
the left rotation supporter includes
a third rotation shaft member connected to the body frame to extend in the direction of the first axis,
a third rotation member connected to the upper portion of the left side case and being supported by the third rotation shaft member when the left side case is attached to the body frame such that the third rotation member is rotatable about the first axis, and
a third inner outer cylindrical damper provided between the third rotation shaft member and the third rotation member, and
the right rotation supporter includes
a fourth rotation shaft member connected to the body frame to extend in the direction of the second axis,
a fourth rotation member connected to the upper portion of the right side case and being supported by the fourth rotation shaft member when the right side case is attached to the body frame such that the fourth rotation member is rotatable about the second axis, and a fourth inner outer cylindrical damper provided between the fourth rotation shaft member and the fourth rotation member.

6. The straddled vehicle according to claim 5, wherein the third inner outer cylindrical damper includes
a third inner cylinder into which the third rotation shaft member is inserted,
a third rubber bush provided to surround an outer peripheral surface of the third inner cylinder, and
a third outer cylinder provided to surround the third rubber bush, and being fixed to the third rotation member, and
the fourth inner outer cylindrical damper includes
a fourth inner cylinder into which the fourth rotation shaft member is inserted,
a fourth rubber bush provided to surround an outer peripheral surface of the fourth inner cylinder, and
a fourth outer cylinder provided to surround the fourth rubber bush, and being fixed to the fourth rotation member.

7. The straddled vehicle according to claim 1, wherein
the first rotation shaft member is connected to the body frame at a position farther forward than the left side case,
the first rotation member is provided to extend rearwardly of the straddled vehicle from the first rotation shaft member,
the left side case has a first insertion portion which opens forwardly of the straddled vehicle and into which a rear end portion of the first rotation member is insertable,
the second rotation shaft member is connected to the body frame at a position farther forward than the right side case,
the second rotation member is provided to extend rearwardly of the straddled vehicle from the second rotation shaft member, and
the right side case has a second insertion portion which opens forwardly of the straddled vehicle and into which a rear end portion of the second rotation member is insertable.

* * * * *